(12) United States Patent
Shin et al.

(10) Patent No.: US 11,665,749 B2
(45) Date of Patent: May 30, 2023

(54) BASE STATION AND UE FOR COMMUNICATING A RAR AND PUSCH

(71) Applicant: LG ELECTRONICS INC., Seoul (KR)

(72) Inventors: Seokmin Shin, Seoul (KR); Suckchel Yang, Seoul (KR); Seonwook Kim, Seoul (KR); Joonkui Ahn, Seoul (KR); Sechang Myung, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/692,958

(22) Filed: Mar. 11, 2022

(65) Prior Publication Data

US 2022/0201772 A1    Jun. 23, 2022

Related U.S. Application Data

(63) Continuation of application No. PCT/KR2020/013360, filed on Sep. 29, 2020.

(30) Foreign Application Priority Data

Oct. 4, 2019  (KR) .................. 10-2019-0123378
Nov. 8, 2019  (KR) .................. 10-2019-0142872
Dec. 5, 2019  (KR) .................. 10-2019-0160937

(51) Int. Cl.
*H04W 74/08* (2009.01)
*H04L 27/26* (2006.01)
(Continued)

(52) U.S. Cl.
CPC ....... *H04W 74/0841* (2013.01); *H04L 5/0044* (2013.01); *H04L 5/0094* (2013.01);
(Continued)

(58) Field of Classification Search
CPC ......... H04W 74/0841; H04W 72/0453; H04W 74/006; H04W 74/0866; H04W 16/14;
(Continued)

(56) References Cited

U.S. PATENT DOCUMENTS

2019/0124649 A1    4/2019  Lunttila et al.
2021/0360572 A1*  11/2021  Manolakos ........... H04L 5/0044

FOREIGN PATENT DOCUMENTS

WO  WO2019160468          8/2019
WO  WO-2019216430 A1 * 11/2019  ......... H04L 27/2602
WO  WO-2021227000 A1 * 11/2021

OTHER PUBLICATIONS

English translation of WO-2019216430-A1, 2019, retrieved from PE2E Search dated Jun. 2, 2022. (Year: 2019).*

(Continued)

*Primary Examiner* — Omar J Ghowrwal
(74) *Attorney, Agent, or Firm* — Fish & Richardson P.C.

(57) ABSTRACT

A method and an apparatus for transmitting/receiving signals in a wireless communication system, according to one embodiment of the present invention, perform a 2- or 4-step random access process in a shared spectrum. In a method for interpreting an FDRA field for PUSCH transmissions corresponding to an RAR in a 4-step random access process or a fallback RAR in a 2-step random access process, the FDRA field is truncated to its X LSB, or the FDRA field is padded with Y MSB, on the basis of whether interlace allocation for a PUSCH for access to a shared spectrum
(Continued)

channel is provided, and the FDRA field is interpreted as the FDRA field of downlink control information (DCI) format 0_0.

20 Claims, 14 Drawing Sheets

(51) Int. Cl.
  *H04W 72/04*   (2009.01)
  *H04W 74/00*   (2009.01)
  *H04L 5/00*   (2006.01)
  *H04W 16/14*   (2009.01)
  *H04W 72/12*   (2009.01)
  *H04W 72/0453*   (2023.01)
  *H04W 72/0446*   (2023.01)
  *H04W 72/1268*   (2023.01)
  *H04W 72/20*   (2023.01)
  *H04W 72/23*   (2023.01)

(52) U.S. Cl.
  CPC .... *H04L 27/2602* (2013.01); *H04L 27/26025* (2021.01); *H04W 16/14* (2013.01); *H04W 72/0446* (2013.01); *H04W 72/0453* (2013.01); *H04W 72/1268* (2013.01); *H04W 72/20* (2023.01); *H04W 72/23* (2023.01); *H04W 74/002* (2013.01); *H04W 74/006* (2013.01); *H04W 74/0808* (2013.01); *H04W 74/0833* (2013.01); *H04W 74/0866* (2013.01)

(58) Field of Classification Search
  CPC ........... H04W 72/042; H04W 72/0446; H04W 72/1278; H04W 74/0833; H04W 72/1268; H04W 72/1289; H04W 74/002; H04W 74/0808; H04L 27/26025; H04L 5/0044; H04L 5/0094; H04L 27/2602
  See application file for complete search history.

(56) References Cited

OTHER PUBLICATIONS

Fujitsu, "On UL signals and channels design for NR-U," R1-1812404, Presented at 3GPP TSG RAN WG1 Meeting #95, Spokane, USA, Nov. 12-16, 2018, 3 pages.
3GPP, "3rd Generation Partnership Project; Technical Specification Group Radio Access Network; NR; Physical channels and modulation (Release 15)," TS 38.211 V15.7.0, Sep. 2019, 97 pages.
3GPP, "3rd Generation Partnership Project; Technical Specification Group Radio Access Network; NR; Multiplexing and channel coding (Release 15)," TS 38.212 V15.7.0, Sep. 2019, 101 pages.
3GPP, "3rd Generation Partnership Project; Technical Specification Group Radio Access Network; NR; Physical layer procedures for control (Release 15)," TS 38.213 V15.7.0, Sep. 2019, 108 pages.
3GPP, "3rd Generation Partnership Project; Technical Specification Group Radio Access Network; NR; Physical layer procedures for data (Release 15)," TS 38.214 V15.7.0, Sep. 2019, 106 pages.
3GPP, "3rd Generation Partnership Project; Technical Specification Group Radio Access Network; NR; NR and NG-RAN Overall Description; Stage 2 (Release 15)," TS 38.300 V15.7.0, Sep. 2019, 99 pages.
3GPP, "3rd Generation Partnership Project; Technical Specification Group Radio Access Network; NR; Radio Resource Control (RRC) protocol specification (Release 15)," TS 38.331 V15.7.0, Sep. 2019, 200 pages.
Extended European Search Report in European Appln. No. 20873147.1, dated Oct. 12, 2022, 6 pages.
Ericsson, "Remaining issues of UL/DL Resource Allocation," R1-1807412, Presented at 3GPP TSG-RAN WG1 Meeting #93, Busan, South Korea, May 21-25, 2018, 13 pages.
Notice of Allowance in Korean Appln. No. 10-2022-7007966, dated Dec. 12, 2022, 6 pages (with English translation).

* cited by examiner

Carrier aggregation between L-band and U-band

Standalone U-band(s)

BASE STATION AND UE FOR COMMUNICATING A RAR AND PUSCH

CROSS-REFERENCE TO RELATED APPLICATIONS

Pursuant to 35 U.S.C. § 119(e), this application is a continuation of International Application PCT/KR2020/013360, filed Sep. 29, 2020, which claims the benefit of earlier filing date and right of priority to Korean Application 10-2019-0123378, filed on Oct. 4, 2019, Korean Application 10-2019-0142872, filed on Nov. 8, 2019, and Korean Application 10-2019-0160937, filed on Dec. 5, 2019, the contents of which are all hereby incorporated by reference herein in their entirety.

TECHNICAL FIELD

The present disclosure relates to a method and an apparatus used in a wireless communication system.

BACKGROUND

Wireless communication systems are being widely deployed to provide various types of communication services such as voice and data. In general, a wireless communication system is multiple access system that can support communication with multiple users by sharing available system resources (e.g., bandwidth, transmission power and the like). Examples of the multiple access system include CDMA (Code Division Multiple Access) system, FDMA (Frequency Division Multiple Access) system, TDMA (Time Division Multiple Access) system, OFDMA (Orthogonal Frequency Division Multiple Access) system, and SC-FDMA (Single Carrier Frequency Division Multiple Access) system and the like.

SUMMARY

An technical problem of the present disclosure is to provide a method for receiving and transmitting a signal for efficiently performing a random access procedure in a wireless communication system and an apparatus therefor.

The technical problem of the present disclosure is not limited to the above-described technical problem, and other technical problems may be inferred from the embodiments of the present disclosure.

The present disclosure is to provide a method and an apparatus for receiving and transmitting a signal in a wireless communication system.

As an aspect of the present disclosure, a method of transmitting and receiving a signal by a user equipment (UE) in a wireless communication system comprises receiving a random access response (RAR) based on a physical random access channel (PRACH); and transmitting a physical uplink shared channel (PUSCH) based on the RAR; wherein the PUSCH is transmitted based on a frequency domain resource assignment (FDRA) field, wherein, based on whether interlace allocation of the PUSCH for shared spectrum channel access is provided or not, the FDRA field is truncated to its X least significant bits (LSBs), or the FDRA field is padded with Y most significant bits (MSBs), and wherein the FDRA field is interpreted as a FDRA field in downlink control information (DCI) format 0_0.

In another aspect of the present disclosure, a communication device (user equipment, UE) for transmitting and receiving a signal in a wireless communication system comprises at least one transceiver, at least one processor; and at least one memory operatively coupled to the at least one processor and storing instructions that, based on being executed, cause the at least one processor to perform a specific operation, and the specific operation includes: receiving a random access response (RAR) based on a physical random access channel (PRACH); and transmitting a physical uplink shared channel (PUSCH) based on the RAR, and the PUSCH is transmitted based on a frequency domain resource assignment (FDRA) field, and, based on whether interlace allocation of the PUSCH for shared spectrum channel access is provided or not, the FDRA field is truncated to its X least significant bits (LSBs), or the FDRA field is padded with Y most significant bits (MSBs), and the FDRA field is interpreted as an FDRA field of DCI (Downlink Control Information) format 0_0.

In another aspect of the present disclosure, a device for a user equipment (UE) includes at least one processor; and at least one computer memory operatively coupled to the at least one processor and based on being executed, causing the at least one processor to perform an operation, and the operation includes: receiving a random access response (RAR) based on a physical random access channel (PRACH); and transmitting a physical uplink shared channel (PUSCH) based on the RAR, and the PUSCH is transmitted based on a frequency domain resource assignment (FDRA) field, and, based on whether interlace allocation of the PUSCH for shared spectrum channel access is provided or not, the FDRA field is truncated to its X least significant bits (LSBs), or the FDRA field is padded with Y most significant bits (MSBs), and the FDRA field is interpreted as an FDRA field of DCI (Downlink Control Information) format 0_0.

In another aspect of the present disclosure, a computer-readable storage medium comprising at least one computer program for causing at least one processor to perform an operation is provided and the operation comprises: receiving a random access response (RAR) based on a physical random access channel (PRACH); and transmitting a physical uplink shared channel (PUSCH) based on the RAR; and the PUSCH is transmitted based on a frequency domain resource assignment (FDRA) field, and, based on whether interlace allocation of the PUSCH for shared spectrum channel access is provided or not, the FDRA field is truncated to its X least significant bits (LSBs), or the FDRA field is padded with Y most significant bits (MSBs), and the FDRA field is interpreted as an FDRA field of DCI (Downlink Control Information) format 0_0.

In the method and devices, based on the interlace allocation of the PUSCH for the shared spectrum channel access being not provided and a number of PRBs in a bandwidth part (BWP) being equal to or less than 90, the FDRA field may be truncated to its X LSBs, where the X LSBs may be determined based on the number of PRBs in the BWP.

In the method and devices, based on the interlace allocation of the PUSCH for the shared spectrum channel access being not provided and a number of PRBs in the BWP being greater than 90, the FDRA field may be padded with Y MSBs, where the X MSBs may be determined based on the number of PRBs in the BWP.

In the method and devices, based on the number of PRBs in the BWP being N, the X LSBs may be determined as ceil $(\log_2(N*(N+1)/2))$ LSB and the Y MSBs may be determined as ceil $(\log_2(N*(N+1)/2))-12$ MSB.

In the method and devices, the FDRA field may be received by a base station in 12 bits, the 90 may be determined in consideration of a maximum number of PRBs that can be indicated by 12 bits in the BWP when resources are allocated based on the interlace allocation of PUSCH for the shared spectrum channel access being not provided.

In the method and devices, based on the interlace allocation of the PUSCH for the shared spectrum channel access being provided, the X LSBs may be determined as 5 LSB for 30 kHz subcarrier spacing (SCS) and 6 LSB for 15 kHz SCS.

The communication devices may include at least a terminal, a network, and an autonomous vehicle capable of communicating with an autonomous vehicle other than the communication device.

The above-described aspects of the present disclosure are only some of the preferred embodiments of the present disclosure, and various embodiments in which the technical features of the present disclosure are reflected may be derived and understood by those of ordinary skill in the art based on the detailed description of the present disclosure to be described below.

According to one embodiment of the present disclosure, when the random access procedure between a UE and a base station is performed, there is an advantage that a more efficient random access procedure may be performed through an operation differentiated from the conventional disclosure.

The technical effects of the present disclosure is not limited to the above-described technical effects, and other technical effects may be inferred from the embodiments of the present disclosure.

DETAILED DESCRIPTION

The following techniques may be used in various radio access systems such as CDMA, FDMA, TDMA, OFDMA, SC-FDMA, and the like. CDMA may be implemented with a radio technology such as Universal Terrestrial Radio Access (UTRA) or CDMA2000. TDMA may be implemented with a radio technology such as Global System for Mobile communications (GSM)/General Packet Radio Service (GPRS)/Enhanced Data Rates for GSM Evolution (EDGE). OFDMA may be implemented with a radio technology such as IEEE 802.11 (WI-FI™), IEEE 802.16 (WIMAX™), IEEE 802-20, Evolved UTRA (E-UTRA), and the like. UTRA is part of the Universal Mobile Telecommunications System (UMTS). 3GPP ($3^{rd}$ Generation Partnership Project) Long Term Evolution (LTE) is a part of Evolved UMTS (E-UMTS) using E-UTRA and LTE-A (Advanced)/LTE-A pro is an evolved version of 3GPP LTE. 3GPP NR (New Radio or New Radio Access Technology) is an evolved version of 3GPP LTE/LTE-A/LTE-A pro.

Figure 1:
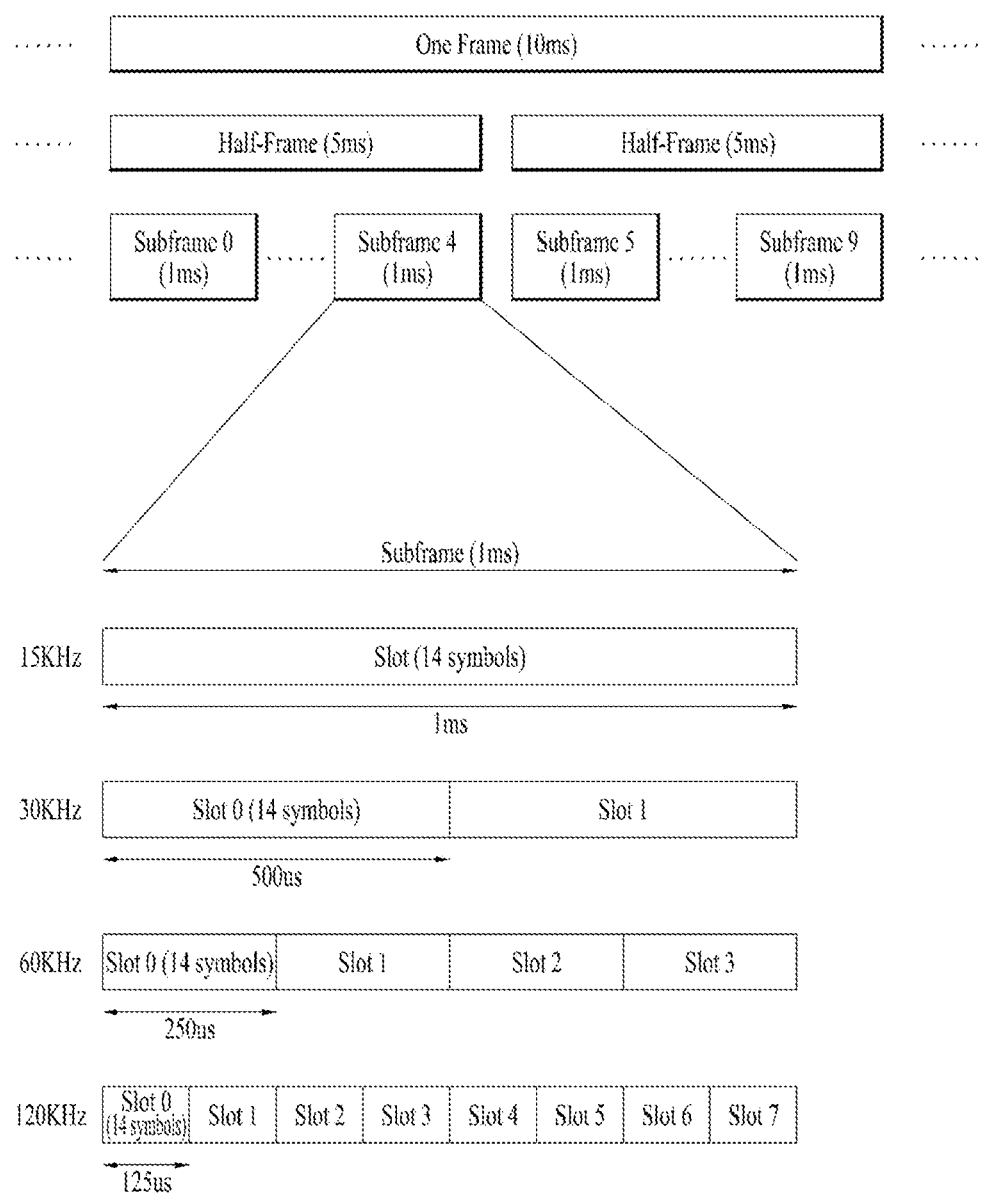
FIG. 1 illustrates a structure of a radio frame.

For clarity of description, it is described based on a 3GPP communication system (e.g., LTE, NR), but the technical idea of the present disclosure is not limited thereto. LTE refers to technology after 3GPP TS 36.xxx Release 8. In detail, LTE technology after 3GPP TS 36.xxx Release 10 is referred to as LTE-A, and LTE technology after 3GPP TS 36.xxx Release 13 is referred to as LTE-A pro. 3GPP NR refers to technology after TS 38.xxx Release 15. LTE/NR may be referred to as a 3GPP system. "xxx" stands for standard document detail number. LTE/NR may be collectively referred to as a 3GPP system. For background art, terms, abbreviations, etc. used in the description of the present disclosure, reference may be made to matters described in standard documents published before the present disclosure. For example, it may refer to the following documents:

3GPP NR
    38.211: Physical channels and modulation
    38.212: Multiplexing and channel coding
    38.213: Physical layer procedures for control
    38.214: Physical layer procedures for data
    38.300: NR and NG-RAN Overall Description
    38.331: Radio Resource Control (RRC) protocol specification FIG. 1 illustrates the structure of a radio frame used in NR.

Uplink (UL) and downlink (DL) transmission in NR consists of frames. A radio frame has a length of 10 ms and is defined as two 5 ms half-frames (Half-Frame, HF). A half-frame is defined as 5 1 ms subframes (Subframe, SF). A subframe is divided into one or more slots, and the number of slots in a subframe depends on subcarrier spacing (SCS). Each slot includes 12 or 14 OFDM(A) symbols according to a cyclic prefix (CP). When a normal CP (CP) is used, each slot includes 14 symbols. When an extended CP (extended CP) is used, each slot includes 12 symbols. Here, the symbol may include an OFDM symbol (or, a CP-OFDM symbol) and an SC-FDMA symbol (or, a DFT-s-OFDM symbol).

Table 1 exemplifies that the number of symbols per a slot, the number of slots per a frame, and the number of slots per a subframe vary according to the SCS when the normal CP is used.

TABLE 1

| SCS (15 * 2^u) | $N_{symb}^{slot}$ | $N_{slot}^{frame,u}$ | $N_{slot}^{subframe,u}$ |
|---|---|---|---|
| 15 kHz (u = 0) | 14 | 10 | 1 |
| 30 kHz (u = 1) | 14 | 20 | 2 |
| 60 kHz (u = 2) | 14 | 40 | 4 |
| 120 kHz (u = 3) | 14 | 80 | 8 |
| 240 kHz (u = 4) | 14 | 160 | 16 |

*$N_{symb}^{slot}$: The number of symbols in a slot
*$N_{slot}^{frame,u}$: The number of slots in a frame
*$N_{slot}^{subframe,u}$: The number of slots in a subframe Table 2 exemplifies that the number of symbols per a slot, the number of slots per a frame, and the number of slots per a subframe vary according to the SCS when the extended CP is used.

TABLE 2

| SCS (15 * 2^u) | $N_{symb}^{slot}$ | $N_{slot}^{frame,u}$ | $N_{slot}^{subframe,u}$ |
|---|---|---|---|
| 60 kHz (u = 2) | 12 | 40 | 4 |

In the NR system, OFDM(A) numerology (e.g., SCS, CP length, etc.) may be configured differently between a plurality of cells merged into one user equipment (UE). Accordingly, an (absolute time) duration of a time resource (e.g., SF, slot, or TTI) (commonly referred to as TU (Time Unit) for convenience) composed of the same number of symbols may be configured differently between the merged cells.

NR supports multiple OFDM (Orthogonal Frequency Division Multiplexing) numerology (e.g., subcarrier spacing, SCS) to support various 5G services. For example, when the SCS is 15 kHz, it supports a wide area in traditional cellular bands, and when the SCS is 30 kHz/60 kHz, it supports dense-urban, lower latency and a wider carrier bandwidth.

NR frequency band is defined as two types of frequency range (FR)(FR1, FR2). FR1/FR2 may be configured as shown in Table 3 below. In addition, FR2 may mean a millimeter wave (mmW).

TABLE 3

| Frequency Range designation | Corresponding frequency range | Subcarrier Spacing |
|---|---|---|
| FR1 | 450 MHz-7125 MHz | 15, 30, 60 kHz |
| FR2 | 24250 MHz-52600 MHz | 60, 120, 240 kHz |

Figure 2:
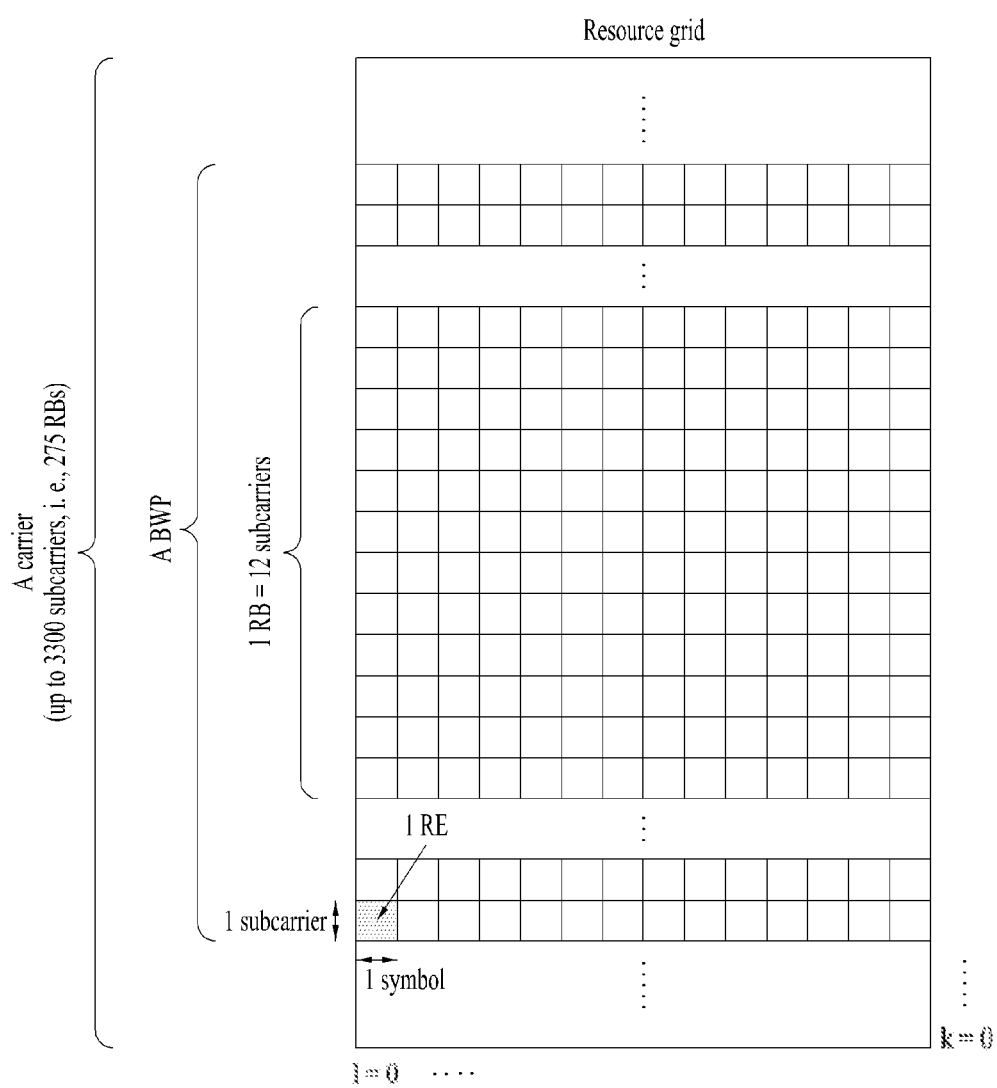
FIG. 2 illustrates a resource grid of a slot.

FIG. 2 exemplifies a slot structure of an NR frame.

A slot includes a pluarlity of symbols in a time domain. For example, in the case of a normal CP, one slot includes 14 symbols, and in the case of an extended CP, one slot includes 12 symbols. The carrier includes a plurality of subcarriers in a frequency domain. A resource block (RB) is defined as a plurality of (e.g., 12) consecutive subcarriers in a frequency domain. A plurality of RB interlaces (simply, interlaces) may be defined in a frequency domain. Interlace m∈{0, 1, . . . , M−1} may be composed of (common) RB {m, M+m, 2M+m, 3M+m, . . . }. M represents the number of interlaces. BWP (Bandwidth Part) is defined as a plurality of consecutive RBs (e.g., physical RB, PRB) in the frequency domain, and may correspond to one OFDM numerology (e.g., SCS (u), CP length, etc.). A carrier may include a maximum of N (e.g., 5) BWPs. Data communication is performed through the activated BWP, and only one BWP can be activated for one UE in one cell/carrier. Each element in the resource grid is referred to as a resource element (RE), and one modulation symbol may be mapped.

In a wireless communication system, the UE receives information through downlink (DL) from the base station and the UE transmits information through uplink (UL) to the base station. Information transmitted and received between the base station and the UE includes data and various control information, and various physical channels/signals exist according to the type/use of the information they transmit and receive. A physical channel corresponds to a set of resource elements (REs) carrying information derived from a higher layer. A physical signal corresponds to a set of resource elements (RE) used by the physical layer (PHY), but does not carry information derived from a higher layer. The higher layer includes a Medium Access Control (MAC) layer, a Radio Link Control (RLC) layer, a Packet Data Convergence Protocol (PDCP) layer, a Radio Resource Control (RRC) layer, and the like.

DL physical channel includes PBCH (Physical Broadcast Channel), PDSCH (Physical Downlink Shared Channel) and PDCCH (Physical Downlink Control Channel). DL physical signal includes DL RS (Reference Signal), PSS (Primary synchronization signal) and SSS (Secondary synchronization signal). DL reference signal (RS) includes DM-RS (Demodulation RS), PT-RS (Phase-tracking RS) and CSI-RS (Channel-state information RS). UL physical channel includes PRACH (Physical Random Access Channel), PUSCH (Physical Uplink Shared Channel) and PUCCH (Physical Uplink Control Channel). UL physical signal includes UL RS. UL RS includes DM-RS, PT-RS and SRS (Sounding RS).

Figure 3:
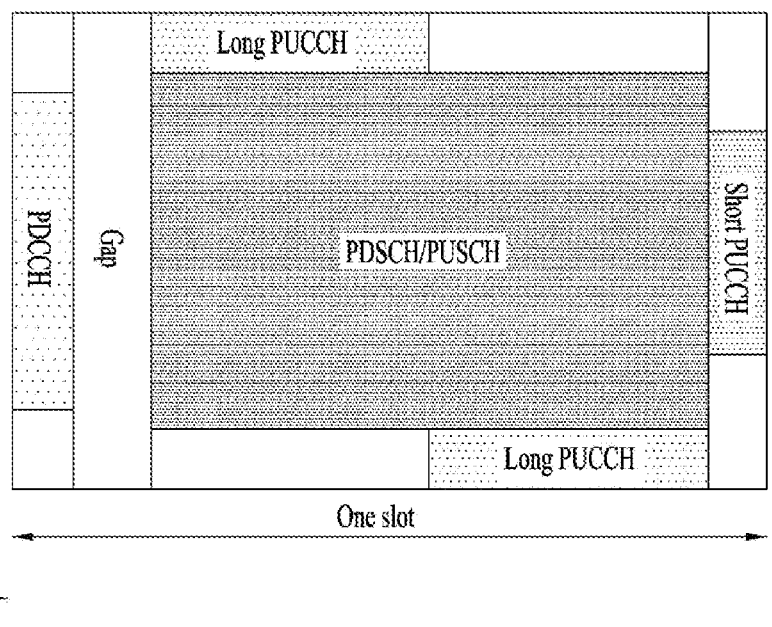
FIG. 3 illustrates an example in which a physical channel is mapped in a slot.

FIG. 3 illustrates an example in which a physical channel is mapped in a slot.

A DL control channel, DL or UL data, UL control channel, etc. may all be included in one slot. For example, the first N symbols in a slot may be used to transmit a DL control channel (hereinafter, DL control region), and the last M symbols in a slot may be used to transmit a UL control channel (hereinafter, UL control region). N and M are each an integer greater than or equal to 0. A resource region (hereinafter, referred to as a data region) between the DL control region and the UL control region may be used for DL data transmission or for UL data transmission. A time gap for DL-to-UL or UL-to-DL switching may exist between the control region and the data region. The PDCCH may be transmitted in the DL control region, and the PDSCH may be transmitted in the DL data region. Some symbols at the time of switching from DL to UL in a slot may be used as a time gap.

In this present disclosure, the base station may be, for example, gNodeB.

Downlink (DL) Physical Channel/Signal (1) PDSCH

PDSCH carries a DL-shared transport block (DL-SCH TB). TB is coded as CodeWord (CW) and then transmitted through a scrambling and modulation procedures. CW includes one or more code blocks (CBs). The one or more CBs are grouped into one CBG (CB group). According to configuration of the cell, PDSCH carry can carry up to two CWs. Scrambling and modulation are performed for each CW, and modulation symbols generated from each CW are mapped to one or more layers. Each layer is mapped to a resource together with DMRS through precoding, and transmitted through a corresponding antenna port. The PDSCH may be dynamically scheduled by the PDCCH or semi-statically (configured scheduling, CS) based on higher layer (e.g., RRC) signaling (and/or Layer 1 (L1) signaling (e.g., PDCCH)). Accordingly, in dynamic scheduling, PDSCH transmission is accompanied by a PDCCH, but in CS, PDSCH transmission is not accompanied by a PDCCH. CS includes semi-persistent scheduling (SPS).

(2) PDCCH

PDCCH carries DCI (Downlink Control Information). For example, PDCCH carries DL-SCH transmission format and resource allocation, frequency/time resource allocation information for UL-SCH (shared channel), paging information on PCH (paging channel), system information on DL-SCH, random access response transmitted on PDSCH Frequency/time resource allocation information for higher layer control messages such as (RAR), transmit power control commands, and information on activation/deactivation of SPS/CS (Configured Scheduling). Various DCI formats are provided according to information in the DCI.

Table 4 illustrates DCI formats transmitted through the PDCCH.

TABLE 4

| DCI format | Usage |
|---|---|
| 0_0 | Scheduling of PUSCH in one cell |
| 0_1 | Scheduling of one or multiple PUSCH in one cell, or indicating downlink feedback information for configured grant PUSCH (CG-DFI) |
| 1_0 | Scheduling of PDSCH in one cell |
| 1_1 | Scheduling of PDSCH in one cell, and/or triggering one shot HARQ-ACK codebook feedback |
| 2_0 | Notifying a group of UEs of the slot format, available RB sets, COT duration and search space set group switching |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS tranmissions by one or more UEs |

DCI format 0_0 may be used to schedule a TB-based (or TB-level) PUSCH, and DCI format 0_1 may be used to schedule a TB-based (or TB-level) PUSCH or a CBG (Code Block Group)-based (or CBG-level) PUSCH. DCI format 1_0 may be used to schedule a TB-based (or TB-level) PDSCH, and DCI format 1_1 (DL grant DCI) may be used to schedule a TB-based (or TB-level) PDSCH or a CBG-based (or CBG-level) PDSCH. DCI format 0_0/0_1 may be referred to as UL grant DCI or UL scheduling information, and DCI format 1_0/1_1 may be referred to as DL grant DCI or UL scheduling information. DCI format 2_0 may be used to deliver dynamic slot format information (e.g., dynamic SFI) to the UE, and DCI format 2_1 may be used to deliver downlink pre-emption information to the UE. DCI format 2_0 and/or DCI format 2_1 may be delivered to the UEs in a corresponding group through a group common PDCCH (Group common PDCCH), which is a PDCCH delivered to the UEs defined as one group.

PDCCH/DCI includes a cyclic redundancy check (CRC), and the CRC is masked/scrambled with various identifiers (e.g., Radio Network Temporary Identifier, RNTI) according to the owner or use purpose of the PDCCH. For example, if the PDCCH is for a specific UE, the CRC is masked with a C-RNTI (Cell-RNTI). If the PDCCH relates to paging, the CRC is masked with a Paging-RNTI (P-RNTI). If the PDCCH relates to system information (e.g., System Information Block, SIB), the CRC is masked with a System Information RNTI (SI-RNTI). If the PDCCH relates to a random access response, the CRC is masked with a random access-RNTI (RA-RNTI).

Table 5 illustrates the use and transport channel of the PDCCH according to the RNTI. The transport channel indicates a transport channel related to data carried by a PDSCH/PUSCH scheduled by the PDCCH.

TABLE 5

| RNTI | Usagae | Transport Channel |
|---|---|---|
| P-RNTI | Paging and System Information change notificaton | PCH(Paging Channel) |
| SI-RNTI | Broadcast of System Information | DL-SCH |
| RA-RNTI | Random Access Response | DL-SCH |
| Temporary C-RNTI | Contention Resolution (when no valid C-RNTI is available) | DL-SCH |
| Temporary C-RNTI | Msg3 transmission | UL-SCH |
| C-RNTI, MCS(Modulation and Coding Scheme)-C-RNTI | Dynamically scheduled unicast transmission | UL-SCH |
| C-RNTI | Dynamically scheduled unicast transmission | DL-SCH |
| MCS-C-RNTI | Dynamically scheduled unicast transmission | DL-SCH |
| C-RNTI | Triggering of PDCCH ordered random access | N/A |
| CS(Configured Scheduling)-RNTI | Configured scheduled unicast transmission (activation, reactivation and retransmission) | DI-SCH, UL-SCH |
| CS-RNTI | Configured scheduled unicast transmission (deactivation) | N/A |
| TPC(Tranmit Power Contol)-PUCCH- RNTI | PUCCH power control | N/A |
| TPC-PUSCH-RNTI | PUSCH power-control | N/A |
| TPC-SRS-RNTI | SRS trigger and power control | N/A |
| INT(Interruption)-RNTI | Indication pre-emption in DL | N/A |
| SFI(Slot Format Indication)-RNTI | Slot Fromat Indication on the given cell | N/A |
| SP(Semi-persistent)-CSI(Channel State Information)-RNTI | Activation of Semi-persisteut CSI repotting on PUSCH | N/A |

The modulation method of the PDCCH is fixed (e.g., Quadrature Phase Shift Keying, QPSK), and one PDCCH is 1, 2, 4, 8, 16 CCE (Control Channel Element), and one PDCCH is composed of 1, 2, 4, 8, or 16 CCEs (Control Channel Elements) according to an Aggregation Level (AL). One CCE consists of six REGs (Resource Element Groups). One REG is defined as one OFDMA symbol and one (P)RB.

A PDCCH is transmitted through a CORESET (Control Resource Set). A CORESET corresponds to a set of physical resources/parameters used to carry PDCCH/DCI within the BWP. For example, the CORESET contains a REG set with a given numerology (e.g., SCS, CP length, etc.). The CORESET may be configured through system information (e.g., MIB) or UE-specific higher layer (e.g., RRC) signaling. Examples of parameters/information used to configure the CORESET are as follows. One or more CORESETs are configured for one UE, and a plurality of CORESETs may overlap in the time/frequency domain.

controlResourceSetId: it indicates identification (ID) information of the CORESET frequencyDomainResources: it indicates frequency domain resource of the CORESET. It is indicated through a bitmap, and each bit corresponds to an RB group (=6 consecutive RBs). For example, the most significant bit (MSB) of the bitmap corresponds to the first RB group in the BWP. An RB group corresponding to a bit having a bit value of 1 is allocated as a frequency domain resource of the CORESET.

duration: it indicates time domain resource of the CORESET. It indicates the number of consecutive OFDMA symbols constituting CORESET. For example, duration has a value oft to 3.

cce-REG-MappingType: it indicates the CCE-to-REG mapping type. Interleaved type and non-interleaved type are supported.

precoderGranularity: it indicates precoder granularity in a frequency domain tci-StatesPDCCH: it indicates information (e.g., TCI-StateID) indicating a transmission configuration indication (TCI) for the PDCCH. The TCI state is used to provide a Quasi-Co-Location (QCL) relationship between the DL RS(s) and the PDCCH DMRS port in the RS set (TCI-state).

tci-PresentInDCI: it indicates whether the TCI field is included in DCI.

pdcch-DMRS-ScramblingID: it indicates information used for initialization of the PDCCH DMRS scrambling sequence.

For PDCCH reception, the UE may monitor a set of PDCCH candidates (e.g., blind decoding) in CORESET. The PDCCH candidate indicates CCE(s) monitored by the UE for PDCCH reception/detection. PDCCH monitoring may be performed in one or more CORESETs on active DL BWPs on each activated cell in which PDCCH monitoring is configured. The set of PDCCH candidates monitored by the UE is defined as a PDCCH search space (SS) set. The SS set may be a Common Search Space (CSS) set or a UE-specific Search Space (USS) set.

Table 6 exemplifies a PDCCH search space.

TABLE 6

| Search Space | Type | RNTI | Use Case |
| --- | --- | --- | --- |
| Type0-PDCCH | Common | SI-RNTI on a primary cell | Broadcast of System Information |
| Type0A-PDCCH | Common | SI-RNTI on a primary cell | Broadcast of System |
| Type1-PDCCH | Common | RA-RNTI or TC-RNTI on a primary cell | Msg2, Msg4 in RACH |
| Type2-PDCCH | Common | P-RNTI on a primary cell | Paging System Information change notfication |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI or CS-RNTI | Group signaling |
| UE Specific | UE Specific | C-RNTI, MCS-C-RNTI or CS-RNTI | UE signaling (e.g., PDSCH/PUSCH) |

A SS set may be configured through system information (e.g., MIB) or UE-specific higher layer (e.g., RRC) signaling. S (e.g., 10) or less SS sets may be configured in each DL BWP of the serving cell. For example, the following parameters/information may be provided for each SS set. Each SS set is associated with one CORESET, and each CORESET configuration may be associated with one or more SS sets.

searchSpaceId: it indicates ID of the SS set.

controlResourceSetId: it indicates a CORESET associated with the SS set.

monitoringSlotPeriodicityAndOffset: it indicates the PDCCH monitoring period interval (slot unit) and the PDCCH monitoring interval offset (slot unit).

monitoringSymbolsWithinSlot: it indicates the first OFDMA symbol(s) for PDCCH monitoring within a slot in which PDCCH monitoring is configured. It is indicated through a bitmap, and each bit corresponds to each OFDMA symbol in a slot. The MSB of the bitmap corresponds to the first OFDM symbol in the slot. OFDMA symbol(s) corresponding to bit(s) having a bit value of 1 corresponds to the first symbol(s) of CORESET in the slot.

nrofCandidates: it indicates the number of PDCCH candidates for each AL={1, 2, 4, 8, 16} (e.g., one of 0, 1, 2, 3, 4, 5, 6, 8).

searchSpaceType: it indicates whether the SS type is CSS or USS.

DCI format: it indicates a DCI format of a PDCCH candidate

Based on the CORESET/SS set configuration, the UE may monitor PDCCH candidates in one or more SS sets in the slot. An occasion (e.g., time/frequency resource) to monitor PDCCH candidates is defined as a PDCCH (monitoring) occasion. One or more PDCCH (monitoring) occasions may be configured within a slot.

Uplink (UL) Physical Channel/Signal (1) PUSCH

A PUSCH carries uplink data (e.g., UL-SCH TB) and/or uplink control information (UC) and is transmitted based on CP-OFDM (Cyclic Prefix-Orthogonal Frequency Division Multiplexing) waveform or DFT-s-OFDM (Discrete Fourier Transform-spread-OFDM) waveform. When the PUSCH is transmitted based on the DFT-s-OFDM waveform, the UE transmits the PUSCH by applying transform precoding. For example, when transform precoding is not possible (e.g., transform precoding is disabled), the UE transmits a PUSCH based on the CP-OFDM waveform, and when transform precoding is possible (e.g., transform precoding is enabled), the UE transmits the CP-OFDM PUSCH may be transmitted based on a waveform or a DFT-s-OFDM waveform. PUSCH may be dynamically scheduled by PDCCH or semi-statically scheduled based on a higher layer (e.g., RRC) signaling (and/or Layer 1 (L1) signaling (e.g., PDCCH))(configured Scheduling, CS). Accordingly, in dynamic scheduling, PUSCH transmission is accompanied by a PDCCH, but in CS, PUSCH transmission is not accompanied by a PDCCH. CS includes Type-1 CG (Configured Grant) PUSCH transmission and Type-2 CG PUSCH transmission. In Type-1 CG, all parameters for PUSCH transmission are signaled by a higher layer. In Type-2 CG, some of the parameters for PUSCH transmission are signaled by a higher layer, and the rest are signaled by the PDCCH. Basically, in CS, PDCCH is not accompanied by PUSCH transmission.

(2) PUCCH

A PUCCH carries uplink control information (UCI). The UCI includes:

SR(Scheduling Request): it is information used to request UL-SCH resources.

HARQ-ACK (Hybrid Automatic Repeat and request Acknowledgment): it is a reception response signal for a DL signal (e.g., PDSCH, SPS release PDCCH). The HARQ-ACK response may include positive ACK (simply, ACK), negative ACK (NACK), DTX (Discontinuous Transmission), or NACK/DTX. HARQ-ACK may be mixed with A/N, ACK/NACK, HARQ-ACK/NACK, and the like. HARQ-ACK may be generated in TB-unit/CBG-unit.

CSI (Channel status information): it is feedback information related to DL channels. The CSI includes CQI (Channel Quality Information), RI (Rank Indicator), PMI (Precoding Matrix Indicator), and PTI (Precoding Type Indicator).

Table 7 exemplifies PUCCH formats. The PUCCH format may be classified according to the UCI payload size/transmission length (e.g., the number of symbols constituting the PUCCH resource)/transmission structure. The PUCCH format may be classified into Short PUCCH (format 0, 2) and Long PUCCH (format 1, 3, 4) according to a transmission length.

TABLE 7

| PUCCH format | Length in OFDM symbols $N_{symb}^{PUCCH}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

(0) PUCCH format 0 (PF0)
supported UCI payload sizes: up to K bits (e.g., K=2)
the number of OFDM symbols constituting a single PUCCH: 1~X symbol (e.g., X=2)
transmission structure: it consists of only UCI signals without DM-RS, and transmits UCI state by selecting and transmitting one of a plurality of sequences.

(1) PUCCH format 1 (PF1)
supported UCI payload sizes: up to K bits (e.g., K=2)
the number of OFDM symbols constituting a single PUCCH: Y~Z symbol (e.g., Y=4, Z=14)
transmission structure: DM-RS and UCI are composed of different OFDM symbols in TDM form, and UCI is a form in which a specific sequence is multiplied by a modulation (e.g., QPSK) symbol. By applying CS (Cyclic Shift)/OCC (Orthogonal Cover Code) to both UCI and DM-RS (within the same RB), CDM is supported between multiple PUCCH resources (according to PUCCH format 1).

(2) PUCCH format 2 (PF2)
supported UCI payload sizes: more than K bits (e.g., K=2)
the number of OFDM symbols constituting a single PUCCH: 1~X symbol (e.g., X=2)
Transmission structure: DMRS and UCI are configured/mapped in FDM form within the same symbol, and transmitted by applying only IFFT without DFT to the encoded UCI bit.

(3) PUCCH format 3 (PF3)
supported UCI payload sizes: more than K bits (e.g., K=2)
the number of OFDM symbols constituting a single PUCCH: Y~Z symbol (e.g., Y=4, Z=14)
Transmission structure: a form in which DMRS and UCI are configured/mapped in TDM form on different symbols, and DFT is applied to the encoded UCI bit for transmission. OCC is applied at the front end of DFT to UCI and CS (or IFDM mapping) is applied to DMRS to support multiplexing to multiple UEs.

Figure 4:
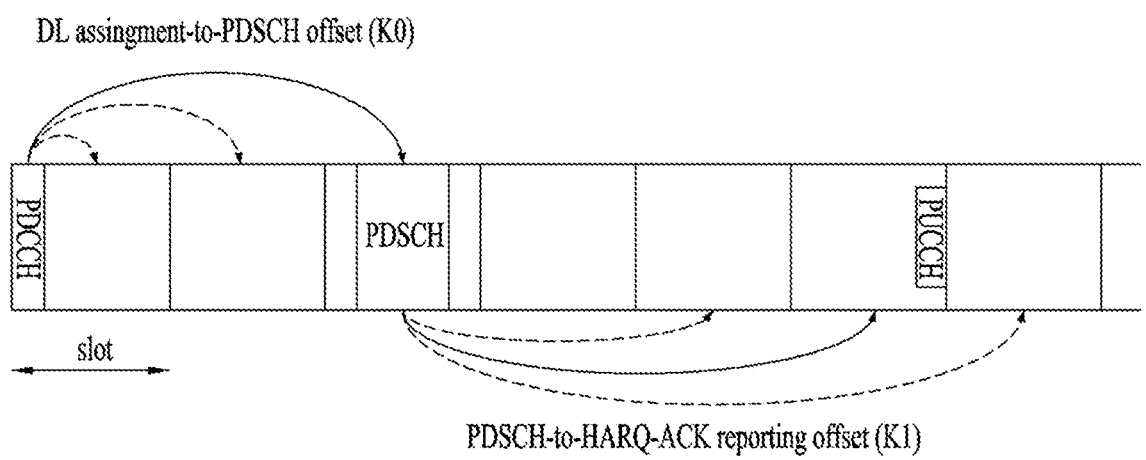
FIG. 4 illustrates an ACK/NACK transmission process.

(4) PUCCH format 4 (PF4)
supported UCI payload sizes: more than K bits (e.g., K=2)
the number of OFDM symbols constituting a single PUCCH: Y~Z symbol (e.g., Y=4, Z=14)
Transmission structure: a structure in which DMRS and UCI are configured/mapped in TDM form on different symbols, and DFT is applied to encoded UCI bits to transmit without inter-terminal multiplexing FIG. 4 exemplifies ACK/NACK transmission procedure. Referring to FIG. 4, the UE may detect the PDCCH in slot #n. Here, the PDCCH includes downlink scheduling information (e.g., DCI formats 1_0 and 1_1), and the PDCCH indicates a DL assignment-to-PDSCH offset (K0) and a PDSCH-HARQ-ACK reporting offset (K1). For example, DCI formats 1_0 and 1_1 may include the following information.

Frequency domain resource assignment: it indicates RB set allocated to the PDSCH.

Time domain resource assignment: K0, it indicates the starting position (e.g., OFDM symbol index) and length (e.g., number of OFDM symbols) of the PDSCH in the slot.

PDSCH-to-HARQ_feedback timing indicator: it indicates K1

Thereafter, the UE may transmit the UCI through the PUCCH in the slot #(n+K1) after receiving the PDSCH in the slot #(n+K0) according to the scheduling information of the slot #n. Here, the UCI includes a HARQ-ACK response for the PDSCH. If the PDSCH is configured to transmit up to 1 TB, the HARQ-ACK response may be configured with 1-bit. When the PDSCH is configured to transmit up to two TBs, the HARQ-ACK response may be configured with 2-bits when spatial bundling is not configured, and may be configured with 1-bits when spatial bundling is configured. When the HARQ-ACK transmission time for the plurality of PDSCHs is designated as slot #(n+K1), the UCI transmitted in the slot #(n+K1) includes HARQ-ACK responses for the plurality of PDSCHs.

1. Wireless Communication System Supporting Unlicensed Band.

Figure 5A:
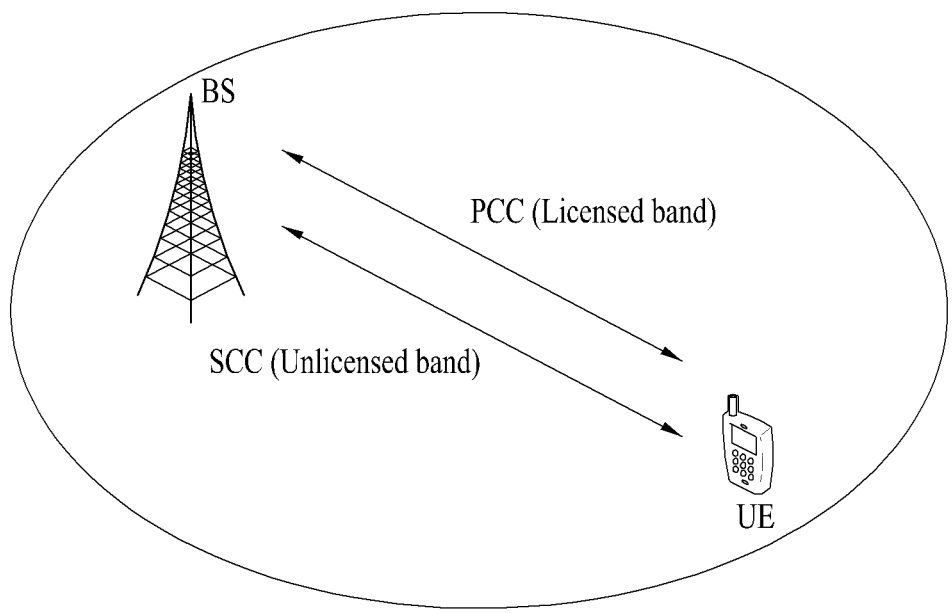
FIGS. 5A and 5B illustrate a wireless communication system supporting an unlicensed band.
Figure 5B:
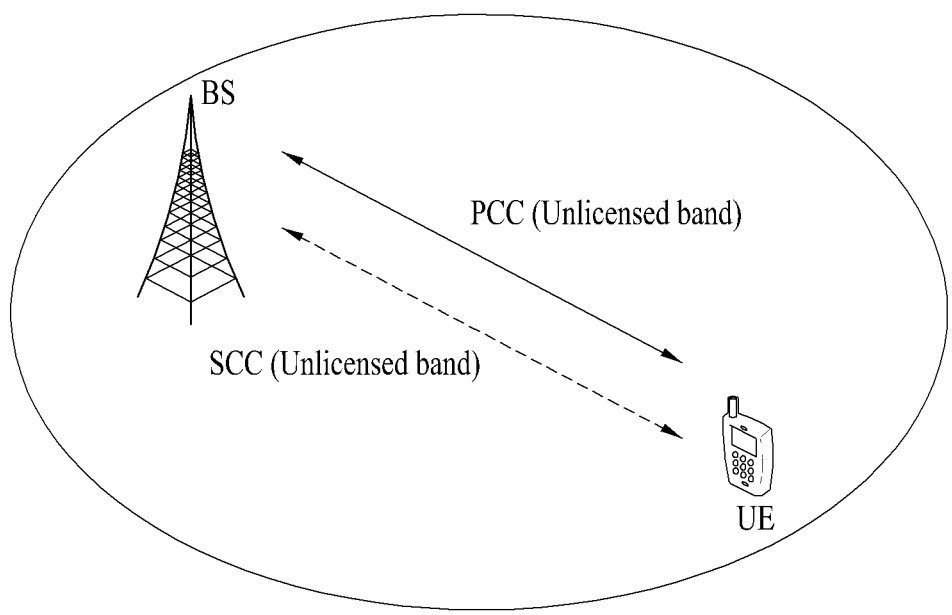

FIGS. 5A and 5B illustrate an example of a wireless communication system supporting the unlicensed band to which the present disclosure is applicable.

In the following description, a cell operating in a licensed band (L-band) is defined as an L-cell, and a carrier of the L-cell is defined as (DL/UL) LCC (Licensed Component Carrier). In addition, a cell operating in an unlicensed band (U-band) is defined as a U-cell, and a carrier of the U-cell is defined as (DL/UL) UCC. The carrier/carrier-frequency of the cell may refer to an operating frequency (e.g., center frequency) of the cell. A cell/carrier (e.g., CC) is collectively referred to as a cell.

When the UE and the base station transmit and receive signals through the carrier combined LCC and UCC, as shown in FIG. 5A, the LCC may be configured to PCC (Primary CC) and UCC may be configured to SCC (Secondary CC). As shown in FIG. 5B, the UE and the base station may transmit and receive signals through one UCC or a plurality of carrier-coupled UCCs. That is, the UE and the base station may transmit and receive signals through only UCC(s) without LCC. For standalone operation, PRACH, PUCCH, PUSCH, SRS transmission, etc. may be supported in the Ucell.

Hereinafter, the signal transmission/reception operation in the unlicensed band described in the present disclosure may be performed based on all the above-described deployment scenarios (unless otherwise stated).

Unless otherwise stated, the following definitions may be applied to terms used in this specification.

Channel: it consists of continuous RBs in which a channel access procedure is performed in a shared spectrum, and may refer to a carrier or a part of a carrier.

CAP (Channel Access Procedure): In order to determine whether the channel is used by other communication node(s) before signal transmission, it is a procedure for evaluating channel availability based on sensing. A basic unit for sensing is a sensing slot of $T_{sl}$=9 us duration. When the base station or the UE senses the channel during the sensing slot period, and the detected power for at least 4 us within the sensing slot period is less than the energy detection threshold $X_{Thresh}$, the sensing slot period $T_{sl}$ is considered to be in the idle state. Otherwise, the sensing slot period $T_{sl}$=9 us is regarded as a busy state. The CAP may be referred to as Listen-Before-Talk (LBT).

Channel occupancy: After performing the channel access procedure, it means the corresponding transmission(s) on the channel(s) by the base station/UE.

COT (Channel Occupancy Time): After the base station/terminal performs the channel access procedure, it refers to the total time during which any base station/UE(s) sharing the channel occupation with the base station/terminal may perform transmission(s) on the channel. When determining the COT, if the transmission gap is 25 us or less, the gap period is also counted in the COT. The COT may be shared for transmission between the base station and the corresponding terminal(s).

DL Transmission Burst: it is defined as the set of transmissions from the base station, with no gaps exceeding 16 us. Transmissions from the base station, separated by a gap greater than 16 us, are considered separate DL transmission bursts from each other. The base station may perform the transmission(s) after the gap without sensing channel availability within the DL transmission burst.

UL Transmission Burst: it is defined as a set of transmissions from the UE, with no gap exceeding 16 us. Transmissions from the UE, separated by a gap greater than 16 us, are considered as separate UL transmission bursts from each other. The UE may perform transmission(s) after the gap without sensing channel availability within the UL transmission burst.

Discovery Burst: it refers to a DL transmission burst comprising a set of signal(s) and/or channel(s), bound within a (time) window and associated with a duty cycle. In an LTE-based system, the discovery burst is transmission(s) initiated by the base station, including PSS, SSS, and cell-specific RS (CRS), and may further include non-zero power CSI-RS. A discovery burst in an NR-based system is the transmission(s) initiated by the base station, including at least an SS/PBCH block, and may further include CORESET for PDCCH scheduling PDSCH with SIB1, PDSCH carrying SIB1 and/or non-zero power CSI-RS.

Figure 6:
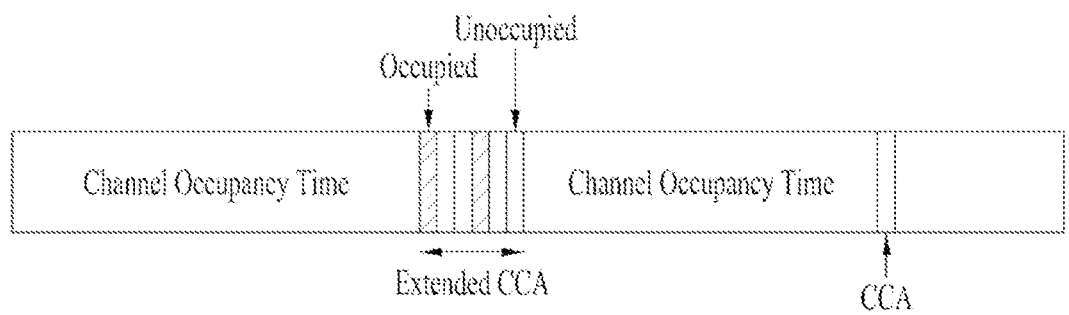
FIG. 6 illustrates a method of occupying resource within an unlicensed band.

FIG. 6 illustrates a method of occupying resources in an unlicensed band. According to regional regulation on unlicensed bands, communication nodes within unlicensed bands must determine whether other communication nodes use channels before transmitting signals. Specifically, the communication nodes may check whether other communication nodes transmit a signal by first performing carrier sensing (CS) before signal transmission. A case in which it is determined that other communication nodes do not transmit a signal is defined as CCA (Clear Channel Assessment) has been confirmed. If there is a CCA threshold configured by predefined or higher layer (e.g., RRC) signaling, the communication nodes may determine the channel state as busy if energy higher than the CCA threshold is detected in the channel, otherwise the channel state may be considered as idle. For reference, in the WI-FI™ standard (802.11ac), the CCA threshold is defined as −62 dBm for a non-WI-FI™ signal and −82 dBm for a WI-FI™ signal. If it is determined that the channel state is in an idle state, the communication nodes may start transmitting a signal in the Ucell. The above-described series of procedures may be referred to as LBT (Listen-Before-Talk) or CAP (Channel Access Procedure). LBT, CAP, and CCA may be expressed interchangeably.

Specifically, for downlink reception/uplink transmission in an unlicensed band, one or more of CAP methods to be described below may be used in a wireless communication system associated with the present disclosure.

Downlink Signal Transmission Method Through Unlicensed Band

The base station may perform one of the following unlicensed band access procedures (e.g., Channel Access Procedure, CAP) for downlink signal transmission in the unlicensed band.

(1) Type 1 Downlink CAP Method

The length of the time duration spanned by the sensing slot sensed as idle before transmission (s) in the type 1 DL CAP is random. Type 1 DL CAP may be applied to the following transmission.

transmission(s) initiated by the base station, comprising (i) a unicast PDSCH with user plane data, or (ii) a unicast PDSCH with user plane data and a unicast PDCCH scheduling user plane data), or, transmission(s) initiated by the base station, either (i) with a discovery burst only, or (ii) with a discovery burst multiplexed with non-unicast information.

Figure 7:
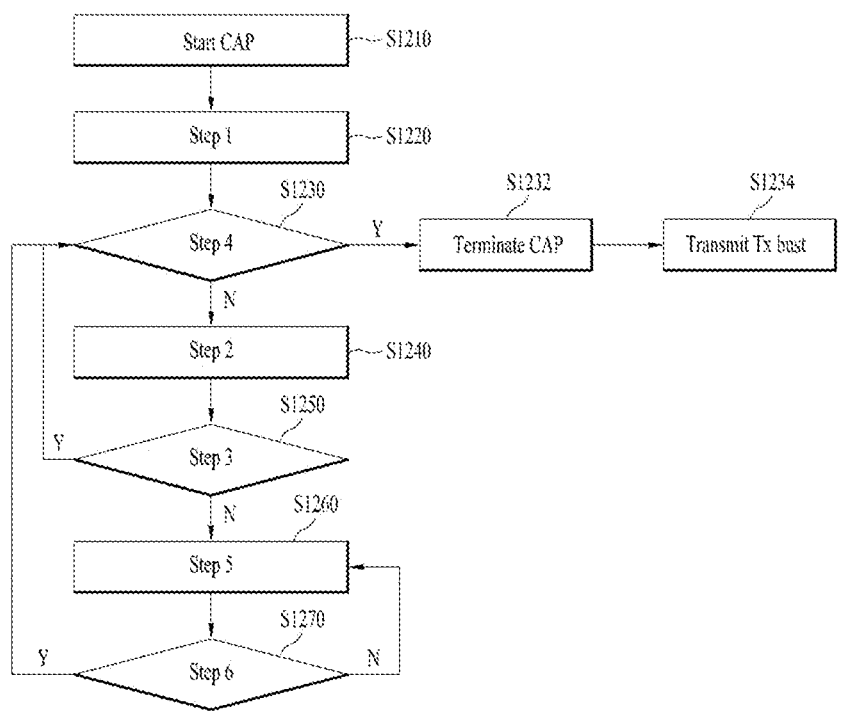
FIG. 7 and FIG. 8 are CAP (Channel Access Procedure) flow charts for signal transmission through the unlicensed band.

FIG. 7 is a CAP operation flowchart for downlink signal transmission through the unlicensed band of the base station.

Referring to FIG. 7, the base station may first sense whether the channel is in an idle state during the sensing slot period of the defer duration Td, and then when the counter N becomes 0, transmission may be performed (S1234). At this time, the counter N is adjusted by sensing the channel during additional sensing slot period(s) according to procedure below:

Step 1) (S1220) set $N=N_{init}$. Here, $N_{init}$ is a random value uniformly distributed between 0 and $CW_p$. Then go to step 4.

Step 2) (S1240) if N>0 and the base station decides to decrement the counter, set N=N−1

Step 3) (S1250) the channel is sensed during the additional sensing slot period. At this time, if the additional sensing slot period is idle (Y), the process moves to step 4. If not (N), go to step 5.

Step 4) (S1230) if N=0 (Y), the CAP procedure ends (S1232). Otherwise (N), go to step 2.

Step 5) (S1260) the channel is sensed until a busy sensing slot is detected within the additional defer duration Td, or all sensing slots within the additional defer duration Td are detected as idle (idle).

Step 6)(S1270) if the channel is sensed as idle during all sensing slot periods of the additional defer duration Td, go to step 4. If not (N), go to step 5.

Table 8 shows that $m_p$ applied to CAP, minimum contention window (CW), maximum CW, maximum channel occupancy time (MCOT) and allowed CW sizes vary according to the channel access priority class.

TABLE 8

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3,7} |
| 2 | 1 | 7 | 15 | 3 ms | {7,15} |
| 3 | 3 | 15 | 63 | 8 or 10 ms | {15,31,63} |
| 4 | 7 | 15 | 1023 | 8 or 10 ms | {15,31,63,127, 255,511,1023} |

The defer duration Td is configured in the order of the period $T_f$ (16 us)+$m_p$ consecutive sensing slot period $T_{sl}$ (9 us). Tf includes the sensing slot period $T_{sl}$ at the start time of the 16 us period.

$CW_{min,p} \leq C_{Wp} \leq CW_{max,p}$. $CW_p$ may be configured as $CW_p = CW_{min,p}$, and may be updated before step 1 based on HARQ-ACK feedback (e.g., ACK or NACK ratio) for the previous DL burst (e.g., PDSCH) (CW size update). For example, $CW_p$ may be initialized to $CW_{min,p}$ based on the HARQ-ACK feedback for the previous DL burst, may be increased to the next highest allowed value, or the existing value may be maintained.

(2) Type 2 Downlink (DL) CAP Method

The length of time duration spanned by the sensing slot sensed as idle before transmission (s) in the type 2 DL CAP is deterministic (deterministic). Type 2 DL CAPs are classified into Type 2A/2B/2C DL CAPs.

Type 2A DL CAP may be applied to the following transmission. In Type 2A DL CAP, the base station may transmit transmission immediately after the channel is sensed as idle for at least the sensing period $T_{short\_dl}$=25 us. Here, $T_{short\_dl}$ consists of a period $T_f$ (=16 us) and one sensing slot period immediately following. Tf includes a sensing slot at the beginning of the duration.

transmission(s) initiated by the base station, (i) with only a discovery burst, or (ii) with a discovery burst multiplexed with non-unicast information, or;

transmission(s) of the base station after a 25 us gap from the transmission(s) by the UE within a shared channel occupancy.

Type 2B DL CAP may be applicable to transmission (s) performed by the base station after a 16 us gap from the transmission (s) by the UE within the shared channel occupation time. In Type 2B DL CAP, the base station may transmit transmission immediately after the channel is sensed as idle for $T_f$=16 us. $T_f$ includes a sensing slot within the last 9 us of the duration. Type 2C DL CAP may be applicable to transmission(s) performed by the base station after a maximum of 16 us gap from transmission(s) by the UE within the shared channel occupation time. In Type 2C DL CAP, the base station does not sense the channel before performing transmission.

Uplink Signal Transmission Method Through the Unlicensed Band

The UE performs a Type 1 or Type 2 CAP for uplink signal transmission in the unlicensed band. In general, the UE may perform a CAP (e.g., type 1 or type 2) configured by the base station for uplink signal transmission. For example, the UE may include CAP type indication information in a UL grant (e.g., DCI formats 0_0, 0_1) for scheduling PUSCH transmission.

(1) Type 1 Uplink (UL) CAP Method

The length of time duration spanned by the sensing slot sensed as idle before transmission (s) in the type 1 DL CAP is random. Type 1 UL CAP may be applied to the following transmission.

PUSCH/SRS transmission(s) configured and/or scheduled from the base station.

PUCCH transmission(s) configured and/or scheduled from the base station.

random access procedure (RAR) related to transmission(s)

Figure 8:
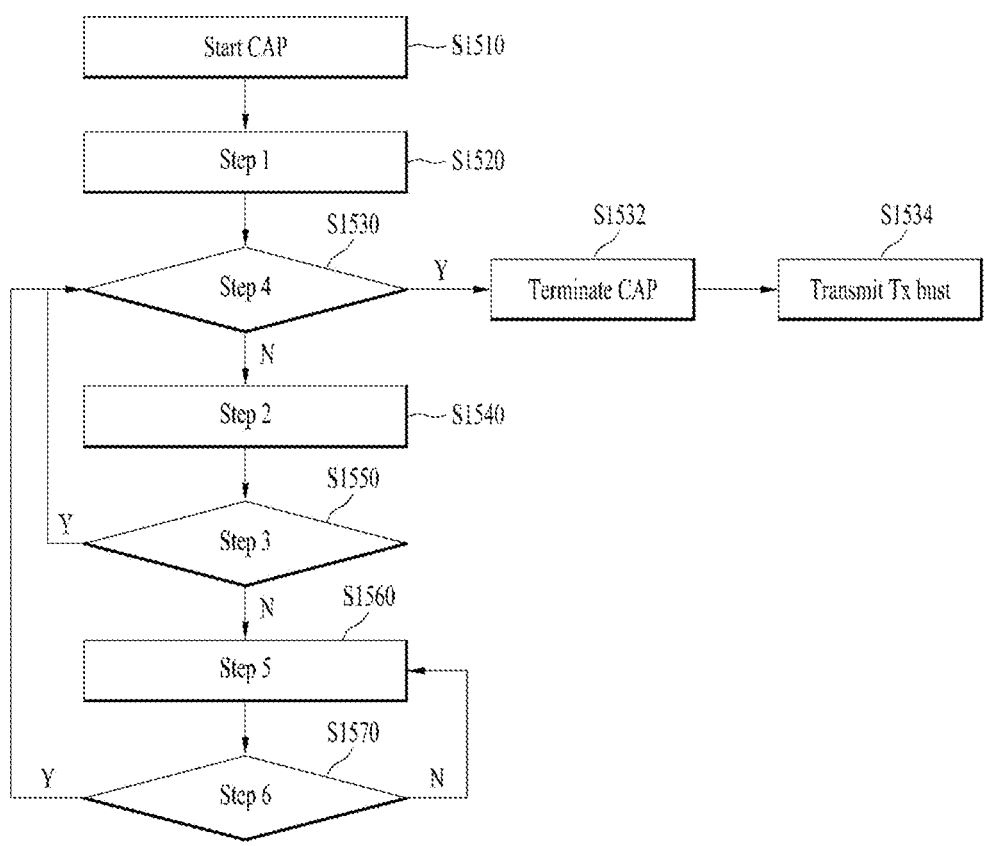

FIG. 8 is a flow chart of the Type 1 CAP operation of the UE for uplink signal transmission.

Referring to FIG. 8, the UE first may sense whether the channel is in an idle state during the sensing slot period of the defer duration Td, and then when the counter N becomes 0, transmission may be performed (S1534). At this time, the counter N is adjusted by sensing the channel during the additional sensing slot period(s) according to the procedure below:

Step 1) (S1520) Set N=Nita. Here, Nita is a random value uniformly distributed between 0 and $CW_p$. Then go to step 4.

Step 2) (S1540) If N>0 and the UE decides to decrement the counter, set N=N−1.

Step 3) (S1550) The channel is sensed during the additional sensing slot period. At this time, if the additional sensing slot period is idle (Y), the process moves to step 4. If not (N), go to step 5.

Step 4) (S1530) If N=0 (Y), the CAP procedure is terminated (S1532). Otherwise (N), go to step 2.

Step 5) (S1560) The channel is sensed until a busy sensing slot is detected in the additional defer duration Td, or all sensing slots in the additional defer duration Td are detected as idle (idle).

Step 6) (S1570) If the channel is sensed as idle during all sensing slot periods of the additional defer duration Td (Y), it moves to step 4. If not (N), go to step 5.

Table 9 shows that $m_p$ applied to CAP, minimum contention window (CW), maximum CW, maximum channel occupancy time (MCOT) and allowed CW sizes vary according to the channel access priority class.

TABLE 9

| Channel Access Priority Class (p) | $m_p$ | $CW_{min,p}$ | $CW_{max,p}$ | $T_{ulmcot,p}$ | allowed $CW_p$ sizes |
|---|---|---|---|---|---|
| 1 | 2 | 3 | 7 | 2 ms | {3,7} |
| 2 | 2 | 7 | 15 | 4 ms | {7,15} |
| 3 | 3 | 15 | 63 | 6 ms or 10 ms | {15,31,63,127, 255,511,1023} |
| 4 | 7 | 15 | 1023 | 6 ms or 10 ms | {15,31,63,127, 255,511,1023} |

The defer duration Td is configured in the order of the period $T_f$ (16 us)+$m_p$ consecutive sensing slot period $T_{sl}$ (9 us). Tf includes the sensing slot period $T_{sl}$ at the start time of the 16 us period.

$CW_{min,p} \leq CW_p \leq CW_{max,p}$. $CW_p$ is configured as $CW_p = CW_{min,p}$, and may be updated before step 1 based on an explicit/implicit reception response to a previous UL burst (e.g., PUSCH) (CW size update). For example, $CW_p$ may be initialized to $CW_{min,p}$ based on an explicit/implicit reception response to the previous UL burst, may be increased to the next highest allowed value, or the existing value may be maintained.

(2) Type 2 Uplink (UL) CAP Method

The length of the time duration spanned by a sensing slot sensed as idle before transmission (s) in a Type 2 UL CAP is deterministic (deterministic). Type 2 UL CAPs are classified into Type 2A/2B/2C UL CAPs. In Type 2A UL CAP, the UE may transmit transmission immediately after the channel is sensed as idle for at least the sensing period $T_{short\_dl}$=25 us. Here, $T_{short\_dl}$ consists of a section Tf (=16 us) and one sensing slot period immediately following. In Type 2A UL CAP, $T_f$ includes a sensing slot at the beginning of the duration. In Type 2B UL CAP, the UE may transmit transmission immediately after the channel is sensed as idle for the sensing period $T_f$=16 us. In Type 2B UL CAP, $T_f$ includes a sensing slot within the last 9 us of the duration. In Type 2C UL CAP, the UE does not sense a channel before performing transmission.

RB Interlace

Figure 9:
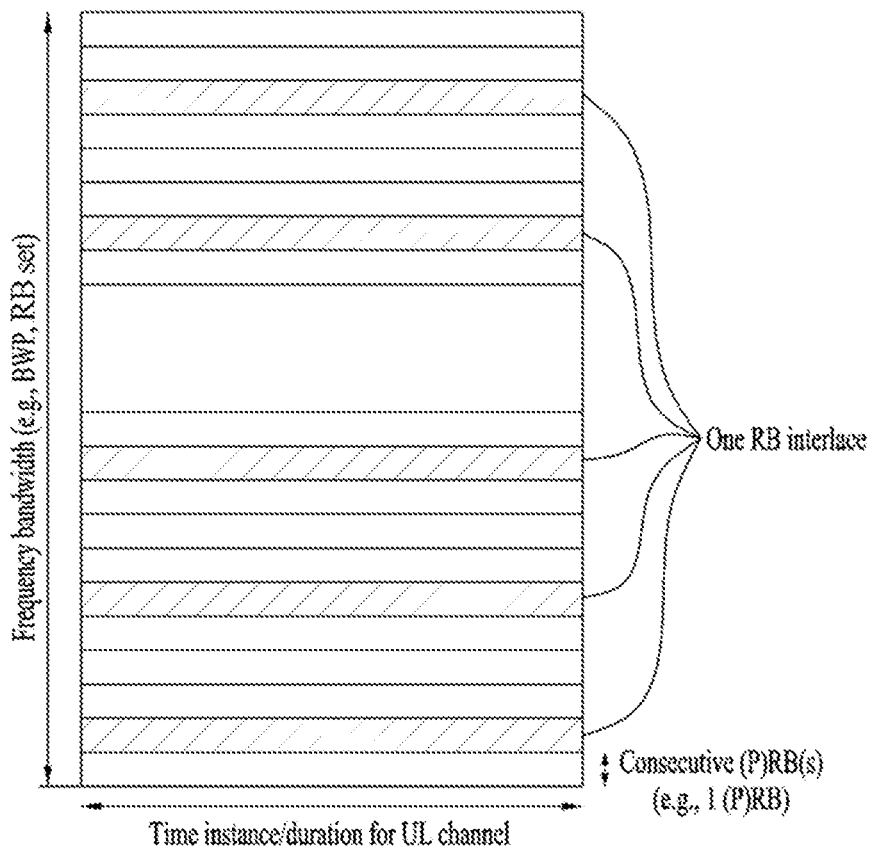
FIG. 9 illustrates an RB interlace.

FIG. 9 illustrates an RB interlace. In the shared spectrum, in consideration of OCB (Occupied Channel Bandwidth) and PSD (Power Spectral Density) related regulations, a set of (single) discontinuous (single) RBs (at equal intervals) on a frequency may be defined as a unit resource used/allocated for UL (physical) channel/signal transmission. Such a discontinuous RB set is defined as "RB interlace" (simply, interlace) for convenience.

Referring to FIG. 9, a plurality of RB interlaces (simply, interlaces) may be defined within a frequency band. Here, the frequency band may include a (wideband) cell/CC/BWP/RB set, and the RB may include a PRB. For example, interlace #m∈{0, 1, . . . , M−1} may consist of (common) RB {m, M+m, 2M+m, 3M+m, . . . }. M represents the number of interlaces. A transmitter (e.g., a UE) may transmit a signal/channel using one or more interlaces. The signal/channel may include PUCCH or PUSCH.

2. Random Access (RA) Procedure

Figure 10A:
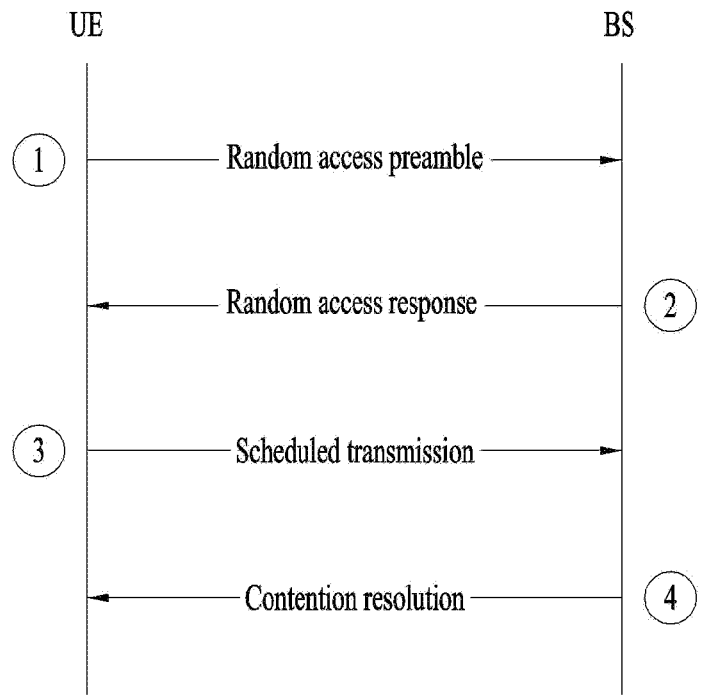
FIG. 10A through FIG. 11B are diagrams related to a random access procedure.
Figure 10B:
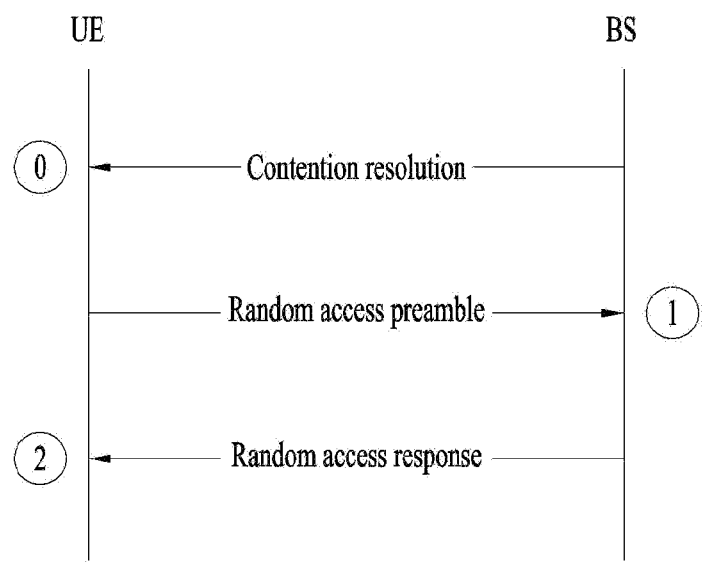

FIGS. 10A and 10B show a random access procedure. FIG. 10A shows a contention-based random access procedure, and FIG. 10B illustrates a dedicated random access procedure.

Referring to FIG. 10A, the contention-based random access procedure includes the following steps. Hereinafter, the message transmitted in steps 1 to 4 may be referred to as messages (Msg) 1 to 4, respectively.

Step 1: the UE transmits a RACH preamble through a RPACH.
Step 2: the UE receives a random access response (RAR) from the base station through the DL-SCH.
Step 3: the UE transmits layer 2/layer 3 message to the base station through the UL-SCH.
Step 4: the UE receives a contention resolution message from the base station through the DL-SCH.

The UE may receive information on the random access from the base station through system information.

If random access is required, the UE transmits the RACH preamble to the base station as in step 1. The base station may distinguish each random access preamble through a time/frequency resource (RACH Occasion; RO) and a random access preamble index (PI) in which the random access preamble is transmitted.

When the base station receives the random access preamble from the UE, the base station transmits the random access response (RAR) message to the UE as in step 2. For the reception of the random access message, the UE monitors the L1/L2 control channel (PDCCH) with CRC masked by RA-RNTI (random access-RNTI), including scheduling information on a random access response message, within a preconfigured time window (e.g., ra-ResponseWindow). PDCCH masked with RA-RNTI may be transmitted only through a common search space. When receiving the scheduling signal masked by the RA-RNTI, the UE may receive a random access response message from the PDSCH indicated by the scheduling information. Thereafter, the UE checks whether there is random access response information indicated to it in the random access response message. Whether or not random access response information indicated to itself exists may be checked by whether a random access preamble ID (RAPID) for a preamble transmitted by the UE exists. The index and RAPID of the preamble transmitted by the UE may be the same. The random access response information includes a corresponding random access preamble index, timing offset information for UL synchronization (e.g., Timing Advance Command, TAC), UL scheduling information for message 3 transmission (e.g., UL grant) and terminal temporary identification information (e.g., Temporary-C-RNTI, TC-RNTI).

The UE receiving the random access response information, as in step 3, transmits UL-SCH (shared channel) data (message 3) through the PUSCH according to the UL scheduling information and the timing offset value. The message 3 may include the ID of the UE (or, the global ID of the UE). Alternatively, the message 3 may include information related to RRC connection request (e.g., RRCSetupRequest message) for initial access. In addition, the message 3 may include a buffer status report (BSR) on the amount of data available for transmission by the UE.

After receiving UL-SCH data, as in step 4, the base station transmits a contention resolution message (message 4) to the UE. When the UE receives the contention resolution message and the contention is resolved successfully, the TC-RNTI is changed to the C-RNTI. Message 4 may include the ID of the UE and/or RRC connection related information (e.g., an RRCSetup message). If the information transmitted through the message 3 and the information received through the message 4 do not match, or if the message 4 is not received for a certain period of time, the UE may retransmit the message 3 as the contention resolution has failed.

Referring to FIG. 10B, the dedicated random access procedure includes the following 3 steps. Hereinafter, the messages transmitted in steps 0 to 2 may be referred to as messages (Msg) 0 to 2, respectively. The dedicated random access procedure may be triggered using a PDCCH (hereinafter referred to as a PDCCH order) for instructing base station to transmit the RACH preamble.

Step 0: the base station allocates a RACH preamble through the dedicated signaling to the UE.
Step 1: the UE transmits the RACH preamble through the PRACH.
Step 2: the UE receives a random access response (RAR) through DL-SCH from the base station through the DL-SCH.

Operations of steps 1 and 2 of the dedicated random access procedure may be the same as step 1 and 2 of the contention-based random access procedure.

In NR, DCI format 1_0 is used to initiate a non-contention-based random access process with a PDCCH command (order). DCI format 1_0 is used to schedule a PDSCH in one DL cell. On the other hand, when the CRC (Cyclic Redundancy Check) of DCI format 1_0 is scrambled with C-RNTI and all bit values of the "Frequency domain resource assignment" field are 1, DCI format 1_0 is used as a PDCCH order indicating a random access procedure. In this case, the field of DCI format 1_0 is configured as follows.

RA preamble index: 6 bit
UL/SUL (Supplementary UL) indicator: 1 bit. When the bit values of the RA preamble index are not all 0 and SUL is configured in the cell for the UE, it indicates the UL carrier on which the PRACH is transmitted in the cell. Otherwise, it is reserved.
SSB (Synchronization Signal/Physical Broadcast Channel) index: 6 bit. When all bit values of the RA preamble index are not 0, it indicates the SSB used to determine the RACH opportunity for PRACH transmission. Otherwise, it is reserved.
PRACH mask index: 4 bit. When all bit values of the RA preamble index are not 0, it indicates the RACH occasion associated with the SSB indicated by the SSB index. Otherwise, it is reserved.
Reserved: 10 bit.

When the DCI format 1_0 does not correspond to the PDCCH order, the DCI format 1_0 consists of fields used to schedule the PDSCH (e.g., time domain resource assignment, MCS (Modulation and Coding Scheme), HARQ process number, PDSCH-to-HARQ_feedback timing indicator and the like).

2-Step Random Access Procedure

As described above, the conventional random access goes through a four-step procedure. In the conventional LTE system, as shown in Table 10, an average of 15.5 ms was required for the four-step random access procedure.

TABLE 10

| Component | Descrption | Time (ms) |
|---|---|---|
| 1 | Average delay due to RACH scheduling period (1 ms RACH cycle) | 0.5 |
| 2 | RACH Preamble | 1 |
| 3-4 | Preamble detection and transmission of RA response (Time between the end RACH transmission and UE's reception of scheduling grant and timing adjustment) | 3 |
| 5 | UE Processing Delay (decoding of scheduling grant, timing alignment and C-RNTI assignment + L1 encoding of RCC Connection Request) | 5 |
| 6 | Transmission of RRC and NAS Request | 1 |
| 7 | Processing delay in eNB (L2 and RRC) | 4 |
| 8 | Transmission of RRC Connection Set-up (and UL grant) | 1 |

In NR system, lower latency than the existing system may be required. In addition, if the random access procedure occurs in the U-band, the random access procedure is terminated and contention is resolved only when the UE and the base station sequentially succeed in LBT in both the 4-step random access procedure. If the LBT fails even in one step of the 4-step random access procedure, resource efficiency is reduced and latency is increased. In particular, if the LBT fails in the scheduling/transmission procedure associated with message 2 or message 3, a decrease in resource efficiency and an increase in latency may occur significantly. Even a random access procedure in the L-band may require a low-latency random access process in various scenarios of an NR system. Accordingly, the 2-step random access procedure may be performed on the L-band as well.

Figure 11A:
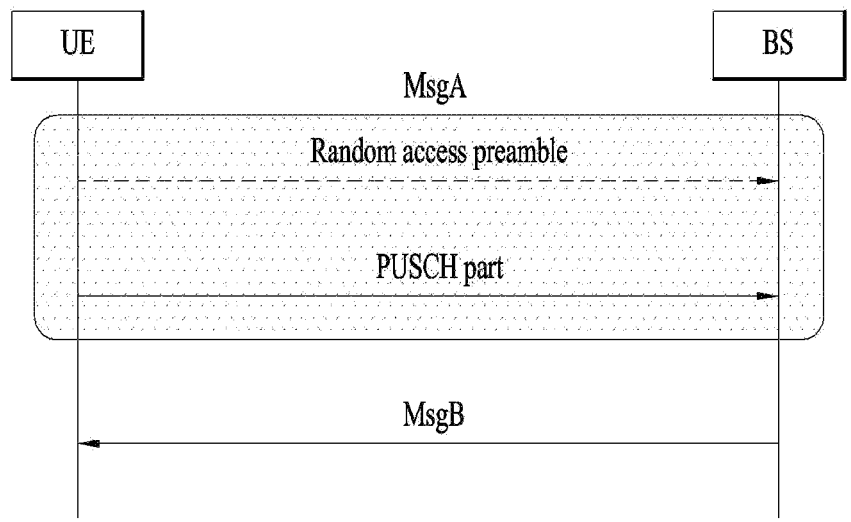

As shown in FIG. 11A, the 2-step random access procedure may consist of two steps of uplink signal (referred to as message A) transmission from the UE to the base station and downlink signal (referred to as message B) transmission from the base station to the UE.

Figure 11B:
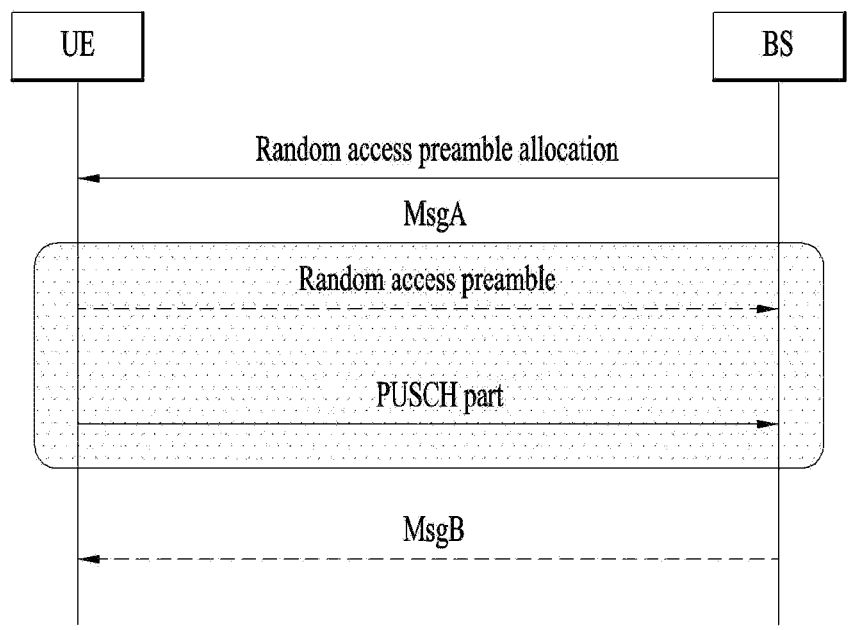

The following description focuses on the initial access process, but the following proposed method may be equally applied to the random access process after the RRC connection between the UE and the base station is made. Also, in the non-contention random access process, as shown in FIG. 11B, the random access preamble and the PUSCH part may be transmitted together.

Although not shown, a PDCCH for scheduling message B may be transmitted from the base station to the terminal, which is Msg. It may be referred to as B PDCCH.

3. Random Access Procedure in the Unlicensed Band

The above-mentioned contents (3GPP system (or NR system), frame structure, etc.) may be applied in combination with the methods proposed in the present disclosure to be described later, or the technical characteristics of the methods proposed in the present disclosure may be clearly described may be supplemented.

As described above, in the WI-FI™ standard (802.11ac), the CCA threshold is defined as −62 dBm for a non-WI-FI™ signal and −82 dBm for a WI-FI™ signal. In other words, when a signal from a device not belonging to the WI-FI™ system is received with a power of −62 dBm or higher in a specific band, the STA (Station) or AP (Access Point) of the WI-FI™ system does not transmit signals in the specific band.

Figures 12, 13:
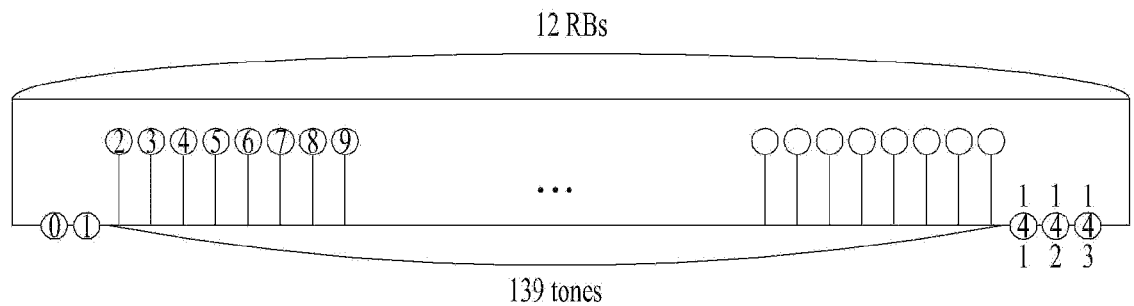
FIG. 12 to FIG. 17 are diagrams for describing a random access procedure according to an embodiment of the present disclosure.

PRACH (Physical Random Access Channel) format includes a Long RACH format and a short RACH format. The PRACH corresponding to the Long RACH format consists of a length 839 sequence. The PRACH corresponding to the Short RACH format consists of a 139-length sequence. Hereinafter, a structure of a sequence constituted by the Short RACH format is proposed. In the FR1 (Frequency Range 1) band of less than 6 GHz, the SCS of the Short RACH format corresponds to 15 and/or 30 KHz. The PRACH corresponding to the Short RACH format may be transmitted through 12 RBs as shown in FIGS. 10A and 10B. 12 RBs include 144 REs, and PRACH may be transmitted on 139 tones (139 REs) of 144 REs. In FIG. 12, two REs in the order of the lowest index and three REs in the order of the highest index of the 144 REs correspond to null tones, but the positions of the null tones may be different from those shown in FIG. 12.

In the present disclosure, the Short RACH format may be referred to as a Short PRACH format, and the Long RACH format may be referred to as a Long PRACH format. The PRACH format may be referred to as a preamble format.

The short PRACH format may consist of values defined in Table 11.

TABLE 11

| Format | $L_{RA}$ | $\Delta f^{RA}$ | $N_u$ | $N_{CP}^{RA}$ |
|---|---|---|---|---|
| A1 | 139 | $15 \times 2^\mu$ kHz | $2 \times 2048\kappa \times 2^{-\mu}$ | $288\kappa \times 2^{-\mu}$ |
| A2 | 139 | $15 \times 2^\mu$ kHz | $4 \times 2048\kappa \times 2^{-\mu}$ | $576\kappa \times 2^{-\mu}$ |
| A3 | 139 | $15 \times 2^\mu$ kHz | $6 \times 2048\kappa \times 2^{-\mu}$ | $864\kappa \times 2^{-\mu}$ |
| B1 | 139 | $15 \times 2^\mu$ kHz | $2 \times 2048\kappa \times 2^{-\mu}$ | $216\kappa \times 2^{-\mu}$ |
| B2 | 139 | $15 \times 2^\mu$ kHz | $4 \times 2048\kappa \times 2^{-\mu}$ | $360\kappa \times 2^{-\mu}$ |
| B3 | 139 | $15 \times 2^\mu$ kHz | $6 \times 2048\kappa \times 2^{-\mu}$ | $504\kappa \times 2^{-\mu}$ |
| B4 | 139 | $15 \times 2^\mu$ kHz | $12 \times 2048\kappa \times 2^{-\mu}$ | $936\kappa \times 2^{-\mu}$ |
| C0 | 139 | $15 \times 2^\mu$ kHz | $2048\kappa \times 2^{-\mu}$ | $1240\kappa \times 2^{-\mu}$ |
| C1 | 139 | $15 \times 2^\mu$ kHz | $4 \times 2048\kappa \times 2^{-\mu}$ | $2048\kappa \times 2^{-\mu}$ |

In the Table 11, $L_{RA}$ is the length of sequence, $\Delta f_{RA}$ is the SCS applied to RACH, AND k is Ts/Tc=64. As $\mu \in \{0,1,2,3\}$, $\mu$ is determined as one of 0, 1, 2, and 3 according to the SCS value. For example, $\mu$ is set to 0 for 15 kHz SCS, and $\mu$ is set to 1 for 30 kHz SCS.

The base station may inform, through higher layer signaling, which the PRACH format can be transmitted at a specific timing for a specific period (duration), and up to how many Ros are in the corresponding slot. Table 6.3.3.2-2 to Table 6.3.3.2-4 of the 38.211 standard correspond to this. Table 12 shows only a few specific excerpts from the indexes that may use A1, A2, A3, B1, B2, B3 alone or in combination in Table 6.3.3.2-3 of the 38.211 standard.

TABLE 12

| PRACH Configuration Index | Preamble format | $n_{SFN} \bmod x = y$ | | Subframe number | Starting symbol | Number of PRACH slots within a subframe | $N_1^{RACH}$, number of time-domain PRACH occasions within a PRACH slot | $N_{CP}^{RA}$, PRACH duration |
|---|---|---|---|---|---|---|---|---|
| | | x | y | | | | | |
| 81 | A1 | 1 | 0 | 4.9 | 0 | 1 | 6 | 2 |
| 82 | A1 | 1 | 0 | 7.9 | 7 | 1 | 3 | 2 |
| 100 | A2 | 1 | 0 | 9 | 9 | 1 | 1 | 4 |
| 101 | A2 | 1 | 0 | 9 | 0 | 1 | 3 | 4 |
| 127 | A3 | 1 | 0 | 4.9 | 0 | 1 | 2 | 6 |
| 128 | A3 | 1 | 0 | 7.9 | 7 | 1 | 1 | 6 |
| 142 | B1 | 1 | 0 | 4.9 | 2 | 1 | 6 | 2 |
| 143 | B1 | 1 | 0 | 7.9 | 8 | 1 | 3 | 2 |
| 221 | A1/B1 | 1 | 0 | 4.9 | 2 | 1 | 6 | 2 |
| 222 | A1/B1 | 1 | 0 | 7.9 | 8 | 1 | 3 | 2 |
| 235 | A2/B2 | 1 | 0 | 4.9 | 0 | 1 | 3 | 4 |
| 236 | A2/B2 | 1 | 0 | 7.9 | 6 | 1 | 2 | 4 |
| 251 | A3/B3 | 1 | 0 | 4.9 | 0 | 1 | 2 | 6 |
| 252 | A3/B3 | 1 | 0 | 7.9 | 2 | 1 | 2 | 6 |

As shown in FIG. 12, it may to know how many Ros are defined in the RACH slot for each preamble format (the number of time-domain PRACH occasions within a PRACH slot of Table 12) and how many OFDM (orthogonal frequency-division multiplexing) symbols are occupied (PRACH duration of Table 12) by the PRACH preamble of each preamble format (PRACH duration in Table 12). In addition, since the starting symbol of the first RO may be indicated for each preamble format, information on from which point in the corresponding RACH slot the RO starts may be transmitted/received between the base station and the UE. FIG. 13 shows a configuration of an RO in a RACH slot for each PRACH configuration index value of Table 12.

On the other hand, the device operating in the unlicensed band checks whether a channel to transmit a signal is in an idle state or a busy state. When a channel is in an idle state, a signal is transmitted through the corresponding channel. When the channel is in the busy state, the device to transmit the signal waits until the channel becomes the idle state before transmitting the signal. As previously described through FIGS. 6 and 7, such an operation may be referred to as an LBT or channel access scheme. In addition, there may be LBT categories (category) as shown in Table 13.

TABLE 13

The channel access schemes for NR-based access for unlicensed spectrum can be classified into the following categories:
Category 1: Immediate transmission after a short switching gap
This is used for a transmitter to immediately transmit after a switching gap inside a COT.
The switching gap from reception to transmission is to accommodate the transceiver turnaround time and is no longer than 16 µs.
Category 2: LBT without random back-off
The duration of time that the channel is sensed to be idle before the transmitting entity transmits is deterministic.
Category 3: LBT with random back-off with a contention window of fixed size
The LBT procedure has the following procedure as one of its components. The transmitting entity draws a random number N within a contention window. The size of the contention window is specified by the minimum and maximum value of N. The size of the contention window is fixed. The random number N is used in the LBT procedure to determine the duration of time that the channel is sensed to be idle before the transmitting entity transmits on the channel.

TABLE 13-continued

Category 4: LBT with random back-off with a contention window of variable size
The LBT procedure has the following as one of its components. The transmitting entity draws a random number N within a contention window. The size of contention window is specified by the minimum and maximum value of N. The transmitting entity can vary the size of the contention window when drawing the random number N. The random number N is used in the LBT procedure to determine the duration of time that the channel is sensed to be idle before the transmitting entity transmits on the channel.

LBT corresponding to category 1 is a method of accessing a channel without LBT. According to the LBT corresponding to the specific category 1, after the specific node occupies the channel, if the time interval until just before the next transmission is less than 16 us, the specific node may access the channel regardless of the state. Next, category 2 LBT is a method of accessing a channel after performing one-shot LBT without a back-off counter value. According to the LBT corresponding to category 2, a specific node performs transmission after determining whether a channel is idle for 16 us (or 25 us).

For LBT corresponding to the category 3 and the category 4, a backoff counter value is randomly selected within a contention window (CW). In this present disclosure, the LBT corresponding to the category 3 may be referred to as a Cat 3 LBT, and the LBT corresponding to the category 4 may be referred to as Cat 4 LBT. For the LBT corresponding to the category 3, a back-off counter value is selected randomly based on the always fixed contention window size value. For the LBT corresponding to the category 4, the contention window size value is increased by 1 step in the allowed candidates each time the LBT fails, starting from the first minimum contention window size value. Candidates for the maximum value, the minimum value, and the allowed contention window size value of the contention window size are predefined for each channel access priority class (see Tables 3 and 4). For example, for Cat 4 LBT having a channel access priority class of 4, the UE initially selects a backoff counter value randomly from 0 to 15. If the UE fails the LBT, the UE randomly selects a backoff counter value from 0 to 31.

The LBT corresponding to the LBT may include a type 2C DL CAP and a type 2C UL CAP as described above. The LBT corresponding to the category 2 may include a type 2A DL CAP, a type 2B DL CAP, and a type 2B UL CAP. The LBT corresponding to the category 4 may include a type 1 DL CAP and a type 1 UL CAP.

The UE selecting the back-off counter value based the values defined in Table 9, if the channel is idle for 16+9×mp+K×9 us, performs an uplink transmission indicated and/or configured from the base station. K is the selected backoff counter value, and $m_p$ corresponds to the slot time applied according to the channel access priority class. The channel access priority class and LBT category for PRACH transmission may be as shown in Table 14.

TABLE 14

|  | Cat 2 LBT | Cat 4 LBT |
|---|---|---|
| PUSCH (including at least UL-SCH with user plane data) | N/A except for the cases discussed in Note 2 below | Channel access priority class selected according to the data |
| SRS-only | N/A | Cat4 with lowest channel access priority class value as in LTE etAA) |
| RACH-only | (see Note 2) | Cat4 with lowest channel access priority class value |
| PUCCH-only | (see Note 2) | Cat4 with lowest channel access priority class value |

Note 2: Applicability of a channel access scheme other than Cat 4 for the following signals/channels have been discussed and details are to be determined when the specifications are developed:
UL control information including UCI only on PUSCH, eq. HARQ-ACK, Scheduling Request, and Channel State Information
Random Access Based on the values that can be derived through Tables 13 and 14, the UE may start PRACH transmission if the channel is idle for 16+9*2+K*9=34+K*9 (us). As described above, the backoff counter value K is randomly selected within the size-varying contention window size value.

The above-described 2-step random access procedure consist of transmission of message A (Msg. A; PRACH preamble and Msg. 3 PUSCH) of the UE, and transmission of message B (Msg. B; RAR and Msg. 4 PDSCH) of the base station. For convenience of description, in the present disclosure, the time and frequency resource to which the PRACH preamble signal of Msg. A is mapped/transmitted is defined as RO (RACH Occasion), and the time and frequency resource to which a Msg. 3 PUSCH signal is mapped/transmitted is defined as PO (PUSCH Occasion). Hereinafter, a specific method for configuring Msg. A is proposed. The RACH preamble constituting Msg. A may be referred to as Msg. A RACH preamble and Msg. A PRACH. The Msg. 3 PUSCH constituting Msg. A may be referred to as Msg. A PUSCH. The RAR constituting Msg. B may be referred to as Msg. B. The Msg. 4 PDSCH constituting Msg. B may be referred to as The Msg. B PDSCH.

Figure 14:
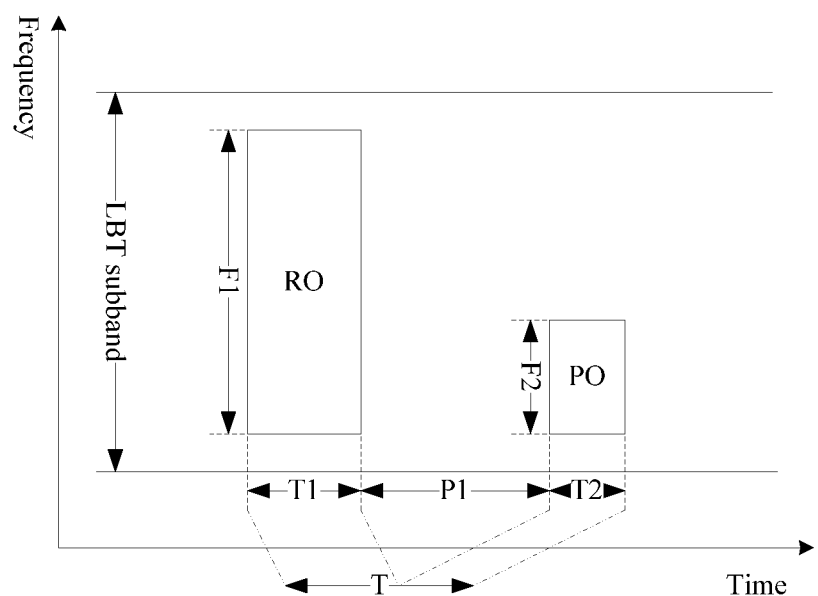

In particular, in NR-U, the operation for the UE's channel access procedure (channel access procedure) to transmit Msg. A in the RO and PO needs to be defined. Accordingly, the present disclosure proposes a channel access procedure according to time/frequency resources of RO and PO and a timing gap between RO and PO. For convenience of description, parameters for time/frequency resources of RO and PO and a time interval between RO and PO are defined as shown in FIG. 14. That is, according to FIG. 14, T1 means a time duration of RO, T2 means a time duration of PO, T means T1+T2, F1 means a frequency bandwidth of RO, F2 means a frequency band of PO, and P1 means a time interval between RO and PO.

Hereinafter, an operation of the UE for performing channel access using channel occupancy sharing, proposed in the present disclosure, will be described.

(1) First, the UE receives control information related to the RO and/or PO from the base station. Here, the control information may include parameters shown in FIG. 14. (2) Next, the UE determines the LBT type to be performed in front of the RO and/or PO based on the control information. (3) Next, the UE transmits an Msg. A preamble and/or Msg. A PUSCH in the RO and/or PO based on the determined LBT type.

For more detailed information, refer to methods to be described later. That is, the methods to be described later may be combined with the procedures of (1) to (3) above to achieve the object/effect proposed in the present disclosure. In addition, the methods to be described later may be combined with the procedure described in the 2 random access process to achieve the object/effect proposed in the present disclosure. In this present disclosure, 'unlicensed band' may be substituted and mixed with 'shared spectrum'. Also, in this present disclosure, 'LBT type' may be substituted and mixed with 'channel access type'. 'LBT' may be substituted and mixed with 'channel access'.

3.1 Embodiment 1: Channel Access Procedure Considering Channel Occupancy Sharing As a first method, a channel access operation for a method in which the UE considers channel occupancy (CO) sharing for Msg. A preamble and Msg. A PUSCH transmission is as follows. At this time, the reason for considering the CO sharing is that if the CO sharing is not performed, Cat-4 LBT (random back-off based) must be performed before all transmissions. That is, through the CO sharing, the LBT process other than the first LBT process may be Cat-1 LBT (no LBT) or Cat-2 LBT (one shot LBT). Therefore, channel access may be performed more quickly and easily. The parameters used in the following description are shown in FIG. 14.

Referring to Table 9, the CO sharing time ($T_{ulmcotp}$) is defined according to priority class (PC). That is, if the PC is 1, the CO sharing time is 2 ms or less, if the PC is 2, the CO sharing time is 4 ms or less, and if the PC is 3 or 4, the CO sharing time is 6 ms or 10 ms or less (whether 6 ms or 10 ms is determined by higher layer signaling). Therefore, the next operation may be divided into the following three durations according to the CO sharing time and PC.

Duration 1: 0 ms<T<=2 ms, in this case, PCRO may be 1 for CO sharing.

Duration 2: 2 ms<T<=4 ms, in this case, PCRO may be 2 for CO sharing.

Duration 3: 4 ms<T<=6 ms (or, 10 ms), in this case, PCRO may be 4 or 4 for CO sharing.

For each duration defined above, the UE may perform the following operation.

1-1. For each interval, the UE performs Cat-4 LBT using the priority class PCRO in front of the Msg A preamble (RACH) occasion (RO). After successful LBT, the UE transmits Msg A preamble, 1-1-A. If P1<16 (us), since the CO sharing is possible, the UE performs Cat-1 LBT (i.e., no LBT) in front of the Msg. A PUSCH occasion (PO).

1-1-B. Otherwise, if the P1 is 16 (us), if T2>X, since the CO sharing is possible, the UE performs Cat-2 LBT (i.e., 16 (us) one shot LBT) in front of the PO. X is the maximum timing duration allowed for UL signal/channel transmission without performing LBT operation. This may be indicated by the base station through higher layer signaling (e.g., SIB or RMSI (remaining minimum system information), etc.). For example, X may be 0.5 ms.

If the T2<=X, since the CO sharing is possible, the UE performs Cat-1 LBT (i.e., no LBT) in front of the PO.

1-1-C. Otherwise, if the P1 is 25 (us), since the CO sharing is possible, the UE performs Cat-2 LBT (i.e., 25 (us) one shot LBT) in front of the PO.

1-1-D. Otherwise, if the P1 is more than 25 (us), if the CO sharing is allowed, the UE performs Cat-2 LBT (i.e., 25 (us) one shot LBT) or Cat-4 LBT indicated through the higher layer signaling (e.g., SIB or RMSI etc.). Priority class PCPO (e.g., $PC_{PO}$ may be the same as $PC_{RO}$) used by the UE performing Cat-4 LBT in front of the PO may be promised in advance or may be indicated through the higher layer signaling (e.g., SIB or RMSI etc.) by the base station.

If CO sharing is not allowed, the UE performs Cat-4 LBT in front of the PO. Priority class $PC_{PO}$ (e.g., $PC_{PO}$ may be the same as the $PC_{RO}$) used by the UE performing Cat-4 LBT in front of the PO may be promised in advance, or may be indicated by the base station through higher layer signaling (e.g., SIB or RMSI).

Characteristically, an upper limit of PI that may perform Cat-2 LBT may be configured. The base station may configure the upper limit of P1 that may perform Cat-2 LBT to the UE through higher layer signaling (e.g., SIB or RMSI, etc.) (or defined in the specification), and the UE may determine the LBT type by comparing the upper limit value of the P1 with the current P1 value and perform a channel access procedure. For example, if the upper limit of the P1 that may perform Cat-2 LBT is $P1_{MAX}$, if the P1 is smaller than $P1_{MAX}$, the UE may perform Cat-2 LBT in front of the PO. If the P1 is greater than $P1_{MAX}$, the UE may perform Cat-4 LBT in front of the PO. In this case, the priority class $PC_{PO}$ (e.g., $PC_{PO}$ may be the same as $PC_{RO}$) used by the UE may be promised in advance, or may be indicated by the base station through higher layer signaling (e.g., SIB or RMSI, etc.).

The base station may also indicate whether the CO sharing is allowed through higher layer signaling (e.g., SIB or RMSI, etc.).

1-2. The operation of embodiment 1 may be applied when F1 and F2 exist in the same LBT sub-band, and/or when F1 includes F2.

3.2 Embodiment 2: Channel Access Procedure without Considering Channel Occupancy Sharing A proposal of a channel access operation for a method in which the UE does not consider CO sharing for Msg. A preamble and Msg A. PUSCH transmission is as follows. The parameters used in the following description are shown in FIG. 14. Also in embodiment 2, the following three time duration, described in Embodiment 1, may be applied.

Duration 1: 0 ms<T<=2 ms, in this case, PCRO may be 1 for CO sharing.

Duration 2: 2 ms<T<=4 ms, in this case, PCRO may be 2 for CO sharing.

Duration 3: 4 ms<T<=6 ms (or, 10 ms), in this case, PCRO may be 3 or 4 for CO sharing.

For each duration defined above, the UE may perform the following operation.

2-1. For each duration, even if T is greater than the maximum value of each duration (because CO sharing is not considered), the UE performs Cat-4 LBT using the priority class PCRO in front of Msg. A preamble RO. The maximum value of each duration may be, for example, 2 ms in Duration 1, 4 ms in Duration 2, and 6 ms (or 10 ms) in Duration 3. PCRO may be 1 when T is greater than 2 ms, PCRO may be 1 or 2 when T is greater than 4 ms, and PCRO may be 1, 2, 3, or 4 when T is greater than 6 ms (or 10 ms). After successful LBT, the UE transmits Msg. A preamble, 2-1-A. (Because CO sharing is not considered), the UE performs Cat-4 LBT in front of the PO. The priority class, PCPO (e.g., PCPO may be the same as PCRO) used by the UE performing Cat-4 LBT in front of the PO may be promised in advance, or may be indicated by the base station through higher layer signaling (e.g., SIB or RMSI, etc.).

2-2. Additionally, F1 and F2 do not exist in the same LBT sub-band, and/or F1 does not include F2, the UE is configured to perform Cat-4 LBT in front of PO If the FBE (frame based equipment) configuration or the LBT before the RO is configured to Cat-2 LBT, the LBT before the PO may be also configured to Cat 2-LBT or configured to apply the same rule as RO.

3.3 Embodiment 3: LBT Type Configuration for A/N Feedback Transmission of Msg. B Next, upon receiving a message (e.g., RRC connection setup, etc.) indicating that the RACH procedure has been successful through the MAC CE of Msg. B, etc. from the base station, the UE needs to transmit an A/N feedback (e.g., ACK) for it. In front of the PUCCH resource for A/N feedback transmission, the UE needs to perform LBT, and a method of determining the corresponding LBT type may be as follows.

3-1. Method in which all UE receiving Msg. B are instructed by a common LBT type 3-1-A. Opt 1) Indicate the LBT type in common to all UEs (or group of UEs) through the PDCCH (e.g., DCI field, etc.) that the base station schedules the PDSCH carrying Msg. B When configured in this way, among the UEs receiving the corresponding Msg. B, the UE that needs to transmit the A/N feedback may be instructed with the same LBT type through the corresponding PDCCH (e.g., specific DCI field), and may perform a channel access procedure using the indicated LBT type (e.g., Cat-2 LBT).

If the base station divides the UE into N (e.g., N=2) groups through a specification criteria, and indicates different LBT types to the N (e.g., N=2) groups for a specific reason (e.g., whether the base station successfully received Msg B), the LBT type corresponding to each group is used. UEs belonging to a specific group may perform a channel access procedure using the same LBT type.

Different LBT types may be indicated using an independent DCI field and the like. If the base station indicates the LBT type for one group through a specific DCI field, the LBT type of the other group may be determined as the LBT type promised in advance according to the indicated DCI field.

3-1-B. Opt2) the base station indicates the LTB type in common to all UEs (or, group of UE), by adding a common field to the PDSCH (e.g., the header part of MAC CE) carrying Msg. B.

If configured as 3-1-B, among the UEs receiving Msg. B, the UE that needs to transmit A/N feedback for it may receive the same LBT type indication through the PDSCH (e.g., the header part of MAC CE) of Msg. B, and may perform channel access procedure using the indicated LBT type (e.g., Cat-2 LBT).

If the base station divides the UE into N (e.g., N=2) groups through a specific criterion, and indicates different LBT types to the N (e.g., N=2) groups for a specific reason (e.g., whether the base station successfully received Msg B), the LBT type corresponding to each group is used. UEs belonging to a specific group may perform a channel access procedure using the same LBT type.

Different LBT types may be indicated using an independent MAC CE header field and the like. If the base station indicates the LBT type for one group through a specific MAC CE header field, the LBT type of another group may be determined as an LBT type promised in advance according to the indicated MAC CE header field.

3-1-C. Opt 3) the base station indicates the LBT type common to all UEs (or group of UE) through higher layer signaling (e.g., SIB or RMSI, etc.)

If configured as 3-1-C, among the UEs receiving Msg. B, the UE that needs to transmit A/N feedback for it may receive the same LBT type indication through higher layer signaling (e.g., SIB or RMSI) and perform channel access procedure using the indicated LBT type (e.g., Cat-2 LBT).

If the base station divides the UE into N (e.g., N=2) groups through a specific criterion and indicates different LBT types to the N (e.g., N=2) groups for a specific reason, the LBT type corresponding to each group is used. UEs belonging to a specific group may perform a channel access procedure using the same LBT type.

Different LBT types may be indicated through independent higher layer signaling and the like. If the base station indicates the LBT type for one group through higher layer signaling, the LBT type of the other group may be determined as an LBT type promised in advance according to the indicated higher layer signaling.

3-1-D. When the base station commonly indicates the LBT type, resource overhead for indicating may be reduced, and there is an advantage that it may be easy to multiplex the A/N to be transmitted by the UE. However, when A/N multiplexing is not performed, since the UEs performing the common LBT type can simultaneously perform channel access, the probability of collision between A/N transmissions increases.

3-2. Method of receiving an indication of a UE-specific LBT type for each success-RAR to the UE receiving Msg. B 3-2-A. Indicate the UE-specific LBT type for each success-RAR, by adding a specific field (or using a reserved field) to a portion indicating a value according to each preamble (and/or PUSCH) transmission of the MAC CE included in the PDSCH carrying Msg B, If configured in this way, among the UEs receiving Msg. B, the UE that needs to transmit A/N feedback for it may receive an indication of the UE-specific LBT type for each success-RAR through the MAC CE, and may perform a channel access using the indicated LBT type. Accordingly, the UE transmits A/N feedback based on the indicated LBT type.

When the base station indicates a UE-specific LBT type for each success RAR, since the time for performing a channel access between the UEs may vary, the probability of collision between A/N transmission is reduced. However, there are disadvantages in that a resource overhead for specifically indicating a UE occurs and it is difficult to perform A/N multiplexing.

3-3. Method of indicating the LBT type to the UE receiving Msg. B in different ways depending on whether the base station has successfully received Msg. B.

For example, the base station may indicate common LBT type through success-RAR and may indicate the RAPID-specific LBT type of the MAC-CE (in the RAR message) through the fallback RAR.

Here, each option of 3-1 in embodiment 3 may be applied as a method of indicating the common LBT type.

Figure 15:
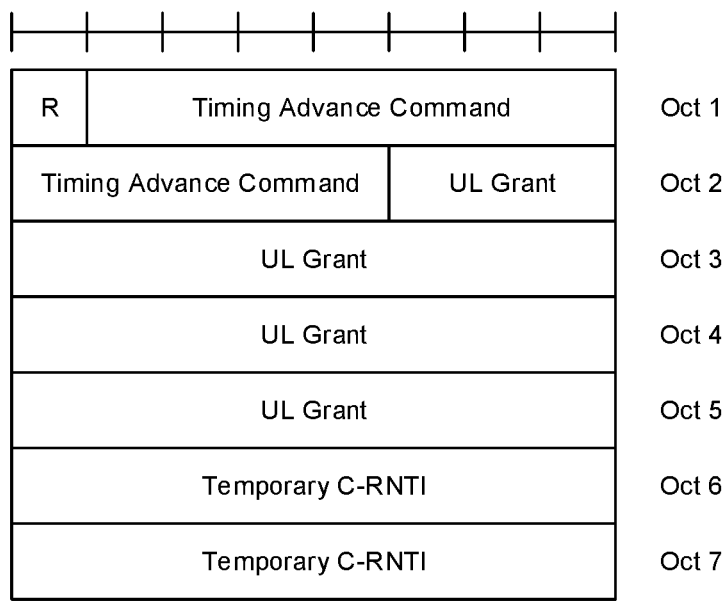

3.4 Embodiment 4: RA Field Configuration of 4-Step Msg. 2 RAR or 2-Step Fall-Back RAR and LBT Type Indication Method for Msg 3 PUSCH Transmission Msg. 2 RAR of the conventional 4-step RACH procedure is defined as shown in FIG. 15.

In addition, 27 bits constituting the UL grant of the Msg. 2 RAR are defined as shown in table 3-4.

TABLE 15

| RAR grant field | Number of bits |
|---|---|
| Frequency hopping flag | 1 |
| PUSCH frequency resource allocation | 14 |
| PUSCH time resource allocation | 4 |
| MCS | 4 |
| TPC command for PUSCH | 3 |
| CSI request | 1 |

Additionally, the CSI request field (CSI request field) may be used or reserved depending on whether the contention is as follows. ("In a non-contention based random access procedure, the CSI request field in the RAR UL grant indicates whether or not the UE includes an aperiodic CSI report in the corresponding PUSCH transmission according to [6, TS 38.214]. In a contention based random access procedure, the CSI request field is reserved.")

Since the LBT type of Msg. 3 PUSCH needs to be transmitted through the RAR, the following methods may be proposed.

Proposed method 4-1-1: Method of indicating the LBT type using the reserved 1 bit of RAR.

When using 1 bit to indicate the LBT type, 1 bit may indicate either Cat-2 LBT or Cat-4 LBT.

Proposed method 4-1-2: Since the CSI request field of the RAR UL grant is reserved in the contention-based RACH process, a method for indicating the LBT type using 1 bit of the CSI request field may be proposed.

When indicating the LBT type using 1 bit of the CSI request field, 1 bit of the CSI request field may indicate either Cat-2 LBT or Cat-4 LBT.

However, in the non-contention-based RACH procedure (e.g., contention free RACH), since the CSI request field is used, another proposed method may be used.

Proposed method 4-1-3: Method of indicating the LBT type using a field unnecessary in the shared spectrum operation among RAR UL grants.

For example, when the frequency resource for Msg 3 PUSCH transmission is allocated in an interlace structure during NR-U operation, since the frequency hopping flag field does not need to be used, the LBT type may be indicated by using (reinterpreting) 1 bit of the frequency hopping flag field.

In the case of indicating the LBT type using 1 bit of the frequency hopping flag field, 1 bit of the frequency hopping flag field may indicate either Cat-2 LBT or Cat-4 LBT.

Even when the frequency resource for Msg. 3 PUSCH transmission during shared spectrum operation is indicated by contiguous PRB allocation of the conventional system, the LBT type may be indicated through the frequency hopping flag field, but since frequency hopping is required in contiguous PRB allocation, the frequency hopping flag field may be used for its intended purpose.

Proposed method 4-1-4: Method of indicating the LBT type using the MSB (Most Significant Bit) (or LSB; Least Significant Bit) L bit(s) of a specific field.

For example, in the PUSCH frequency resource allocation field, the number of bits used as shown in Table 16 varies according to the resource allocation type. Table 16 shows the number of bits of the frequency resource allocation field for PUSCH transmission based on the 20 MHz LBT subband.

TABLE 16

| | Rel-15 | | | |
|---|---|---|---|---|
| | RA Type 0 (bit map) | | | |
| SCS | Configuration 1 (Smaller RBG Size) | Configuration 2 (Larger RBG Size) | RA Type 1 (RIV) | Rel-16 Interlace level allocation |
| 15 kHz (106 PRBs) | 14 (RBG size 8) | 7 (RBG size 16) | 13 | Alt1) 10 (Bit map) Alt2) 6 (RIV) |
| 30 kHz (51 PRBs) | 13 (RBG size 4) | 7 (RBG size 8) | 11 | 5 (Bit map) |
| 15 kHz (96 PRBs) | 12 (RBG size 8) | 6 (RBG size 16) | 13 | Alt1) 10 (Bit map) Alt2) 6 (RIV) |
| 30 kHz (48 PRBs) | 12 (RBG size 4) | 6 (RBG size 8) | 11 | 5 (Bit map) |

Referring to Table 16, PUSCH frequency resource allocation field may be used from a maximum of 14 bits to a minimum of 5 bits.

Here, the LBT type may be indicated using MSB (or LSB) L bits(s) of the PUSCH frequency resource allocation field.

For example, when the LBT type is indicated using the MSB 1 bit of the PUSCH frequency resource allocation field, the MSB 1 bit of the PUSCH frequency resource allocation field may indicate Cat-2 LBT or Cat-4 LBT.

As another example, when the LBT type is indicated using 2 bits of the MSB (or LSB) of the PUSCH frequency resource allocation field, two types of priority classes together with Cat-2 LBT or Cat-4 LBT (e.g., PC0 or PC1) may be indicated.

As another example, when the LBT type is indicated using 3 bits of the MSB (or LSB) of the PUSCH frequency resource allocation field, four types of priority classes (e.g., one of PC0 to PC3) may be indicated together with Cat-2 LBT or Cat-4 LBT. Alternatively, Cat-1 LBT, Cat-2 LBT, Cat-4 LBT and various priority classes may be combined and indicated.

Characteristically, the UE interpreting the actual PUSCH frequency resource allocation field may be configured to understand PUSCH frequency resource allocation, assuming that the MSB (or LSB) L bit value used for the LBT type is 0.

Proposed method 4-1-5: Method of reducing the size of a specific field by L bits and making it a field indicating the LBT type by using the reduced L bits.

4-1-5-A: During the RACH process in the shared spectrum, since the Msg 3 PUSCH uses the conventional RA type 1 (Rel-15 RA Type 1 in Table 15) or a new RA type (Rel-16 Interlace level allocation in Table 15), the PUSCH frequency resource allocation field may be configured to 13 bits. Among the 14 bits for the conventional PUSCH frequency resource allocation field, the remaining 1 bit may be configured as a field indicating the LBT type. As an example, when the LBT type is indicated using 1 bit MSB in the 14-bit PUSCH frequency resource allocation field, Cat-2 LBT or Cat-4 LBT may be indicated.

4-1-5-B: Additionally, the actual PUSCH frequency resource allocation field may be configured to a less than 13 bits (e.g., 12 bit, etc.). The remaining bits among 14 bits for the conventional PUSCH frequency resource allocation field may be configured as a field indicating the LBT type. As an example, when the LBT type is indicated using 2 bits of the MSB (or LSB) in the 14-bit PUSCH frequency resource allocation field, two types of priority classes (e.g., PC0 or PC1) may be indicated together with Cat-2 LBT or Cat-4 LBT. The UE may be configured to understand PUSCH frequency resource allocation assuming that the reduced MSB (or LSB) is 0. For example, among the 14 bits in which the conventional PUSCH frequency resource allocation field is located in the RAR grant, 2 bits of MSB are used as a field indicating a channel access type, and 12 bits of LSB are used as a frequency resource allocation field as in the prior art, but LSB 12 Bits may be interpreted like a 14-bit field, assuming that there are zeros of two bits before 12 bits. As another example, when PUSCH frequency resource allocation is performed with 12 bits, the UE assumes that 1-bit MSB (or LSB) is 0, and may be configured to understand PUSCH frequency resource allocation. Because RIV requires up to 13 bits, only 13−12=1 bit MSB (or LSB) is treated as 0.

The proposed method 4-1-3 is additionally applied to the proposed method 4-1-5, and the LBT type field and the MSB (or LSB) L-bit combination of the specific field (e.g., PUSCH frequency resource allocation field) LBT The type may be indicated.

Proposed method 4-1-6: a combination of the proposed methods of 4-1-1 to 4-1-5 may be considered.

That is, the LBT type may be indicated by a combination of reserved 1 bit of RAR, and/or CSI request field 1 bit of RAR UL grant, and/or a field not used in a shared spectrum among RAR UL grants, and/or MSB (or LSB) L bit(s) of a specific field.

Additionally, it may be considered that Msg. 3 does not indicate the LBT type for PUSCH transmission. As an example, when the LBT type for Msg. 3 PUSCH transmission is configured to LBE (load based equipment) through SIB, a default value may be configured/defined as Cat-4 LBT. When the LBT type for Msg. 3 PUSCH transmission is configured to FBE (frame based equipment) through SIB, the default value may be configured/defined as Cat-2 LBT with 25 usec (or with 16 usec).

Characteristically, when the UE is configured to LBE through SIB in the 2-step RACH procedure, even if the default value of Msg. A PUSCH (or Msg. 3 PUSCH) transmission is configured/defined as Cat-4 LBT, another category of LBT may be used according to the interval between RO-Pos as in the embodiments of the present specification. Similarly, when the UE is configured to FBE through SIB, even if the default value of Msg. A PUSCH (or Msg. 3 PUSCH) transmission is configured/defined as Cat-2 LBT with 25 usec, (in the gap between RO-PO Depending) Cat-2 LBT with 16 usec or Cat-1 LBT may be used.

Additionally, not only the LBT type but also the Msg. 3 PUSCH start position may be additionally signaled through the RAR. This is summarized as follows.

4-2-1) when the legacy NR waveform is configured to (Msg. 3) PUSCH waveform from the base station, Opt 1: Applying a fixed starting position to the fixed LBT type for Msg. 3 PUSCH transmission Opt 2: Applying the fixed LBT type to Msg. 3 PUSCH transmission and indicating one of a pluarlity of starting positions to as RAR (or UL grant of RAR).

Opt 3: Applying the fixed starting position to Msg. 3 PUSCH transmission and indicating one of a pluarlity of LBT types as RAR (or UL grant of RAR).

4-2-2) When the interlace waveform is configured as the (Msg. 3) PUSCH waveform from the base station, Opt 1: One of a combination of multiple LBT types and multiple starting positions is indicated by RAR (or UL grant of RAR)

Accordingly, the LBT type indicated through the RAR grant in the previous proposed methods (suggested methods 4-1-1 to 4-1-6, etc.) may mean a combination of LBT type or starting position or {LBT type, starting position} according to Opt 1 to 3 method of 4-2-1. At this time, assuming that the starting symbol of the resource mapping the PUSCH signal is indicated by Symbol #K, when the starting position is indicated by 1-bit, one of {Symbol #K, Symbol #(K–N)+25 us} may be indicated, or one of {Symbol #K, Symbol #(K–N)+25 us+TA} may be indicated. On the other hand, if the starting position is not indicated through the RAR grant and is determined as a single fixed value, the value may be defined as Symbol #K.

As described above through the proposed method 4-1-5-B, when it is necessary to indicate the LBT type for Msg 3 transmission from the base station (e.g., for operation with shared spectrum channel access), the size of the PUSCH frequency resource allocation field of the RAR may be reduced by 2 bits. 2 bits not used as the PUSCH frequency resource allocation field may be used as a field for explicitly transmitting the LBT type. A field for transmitting the LBT type may be defined as a ChannelAccess-Cpext field. The fields of the RAR grant shown in Table 16 may be redefined as shown in Table 17.

TABLE 17

| RAR grant field | Number of bits |
| --- | --- |
| Frequency hopping flag | 1 |
| PUSCH frequency resource allocation | 14, for operation without shared spectrum channel access 12, for operation with shared spectrum channel access |
| PUSCH time resource allocation | 4 |
| MCS | 4 |
| TPC command for PUSCH | 3 |
| CSI request | 1 |
| ChannelAccess-Cpext | 0, for operation without shared spectrum channel access 2, for operation with shared spectrum channel access |

On the other hand, when the size (i.e., $N_{BWP}^{size}$) of the PUSCH resource allocation field becomes 12 (i.e., when it is necessary to indicate the LBT type for Msg 3 transmission from the base station), the contents of Table 18 below describing truncation and padding of the conventional PUSCH frequency resource allocation field may be insufficient for the UE to interpret the ChannelAccess-Cpext field and the PUSCH frequency resource allocation field.

TABLE 18

The frequency domain resource allocation is by uplink resource allocation type 1 if useInterlacePUSCH-Common is not provided and by uplink resource allocation type 2 if useInterlacePUSCH-Common is provided [6, TS 38.214]. For an initial UL BWP size of $N_{BWP}^{size}$ RBs, a UE processes the frequency domain resource assignment field as follows
 - if $N_{BWP}^{size} \leq 180$
  -truncate the frequency domain resource assignment field to its $[\log_2(N_{BWP}^{size} * (N_{BWP}^{size} + 1)/2)]$ least significant bits and interpret the truncated frequency resource assignment field as for the frequency resource assignment field in DCI format 0_0 as described in [5, TS 38.212]
 - else
  -insert $[\log_2(N_{BWP}^{size} * (N_{BWP}^{size} + 1)/2)] - 14$ most significant bits with value set to '0' after the $N_{UL,hop}$ bits to the frequency domain resource assignment field, where $N_{UL,hop} = 0$ if the frequency hopping flag is set to '0' and $N_{UL,hop}$ is provided in Table 8.3-1 if the hopping flag bit is set to '1', and interpret the expanded frequency resource assignment field as for the frequency resource assignment field in DCI format 0_0 as described in [5, TS 38.212]
 - end if Therefore, Table 18 may be modified based on the proposal of the present disclosure as follows.

4-3-1. For the operation without shared spectrum channel access, operation of conventional system.

4-3-1-A. If the number of PRBs in BWP is 180 or less,

The UE truncates the FDRA (Frequency domain resource assignment) field to as much as its LSB$\lceil\log_2(N_{BWP}^{size} * (N_{BWP}^{size}+1)/2)\rceil$, and interprets the truncated FDRA field as an FDRA field of DCI format 0_0.

4-3-1-B. If the number of PRBs in BWP is more than 180, the UE performs padding 0 as much as MSB $[\log_2(N_{BWP}^{size}*(N_{BWP}^{size}+1)/2)]-14$ in front of the FDRA field, and interprets the extended FERA field as an FDRA field of DCI format 0_0. At this time, if the frequency hopping flag is 0, $N_{UL,hop}$ is 0, and if the frequency hopping flag is 1, $N_{UL,hop}$ follows Table 19.

TABLE 19

| Number of PRBs in initial UL BWP | Value of $N_{UL, hop}$ Hopping Bits | Frequency offset for $2^{nd}$ hop |
| --- | --- | --- |
| $N_{BWP}^{size} < 50$ | 0 | $[N_{BWP}^{size}/2]$ |
|  | 1 | $[N_{BWP}^{size}/4]$ |
| $N_{BWP}^{size} \geq 50$ | 00 | $[N_{BWP}^{size}/2]$ |
|  | 01 | $[N_{BWP}^{size}/4]$ |
|  | 10 | $-[N_{BWP}^{size}/4]$ |
|  | 11 | Reserved |

4-3-1-B. End If 4-3-2. Shared spectrum channel access operation 4-3-2-A. When the higher layer parameter useInterlacePUSCH-Common is not provided (If useInterlacePUSCH-Common is not provided), that is, when continuous mapping which is uplink resource allocation type 1 (uplink resource allocation type 1) is used, 4-3-2-A-i. If the number of PRBs ($N_{BWP}^{size}$) in BWP is 90 or less the UE truncates the FDRA field to as much as its LSB($\lceil\log_2 (N_{BWP}^{size}*(N_{BWP}^{size}+1)/2)\rceil$), and interprets the truncated FDRA field as an FDRA field of DCI format 0_0.

4-3-2-A-ii. If the number of PRBs in BWP is more than 90, the UE performs padding 0 as much as MSB in front of the FDRA field, and interprets the extended FDRA field as an FDRA field of DCI format 0_0. At this time, if the frequency hopping flag is 0, $N_{UL,hop}$ is 0, and if the frequency hopping flag is 1, $N_{UL,hop}$ follows Table 19.

4-3-2-A-iii. End If 4-3-2-A-iv. In this case, the new threshold value of 90 means the maximum number of PRBs of the BWP that can be transmitted in 12 bits when the uplink resource allocation type 1 (RIV) scheme is used. (90*91/2=4095≤4096=2¹²)

4-3-2-B. If higher layer parameter useInterlacePUSCH-Common is provided, that is, when the uplink resource allocation type 2 which is interlace mapping is used 4-3-2-B-i. the UE truncates the FDRA field to its LSB (or MSB) X bits, and interprets the truncated FDRA field as the FDRA field of DCI format 0_0. When PUSCH is transmitted in a band in which 30 kHz SCS is configured (i.e., µ=1), X is 5, and when PUSCH is transmitted in a band in which 15 kHz SCS is configured (i.e., µ=0), X is 6.

4-3-2-B-ii. When LBT sub-band allocation is added, the Y bit may be added in front of or rear of the X bit of FDRA field. According to the number of LBT subbands set in the BWP, Y may be determined as one of {0, 1, 2, 3, 4}.

Based on 4-3-1 and 4-3-2, table 18 may be modified as shown in table 20.

TABLE 20

The frequency domain resource allocation is by uplink resource allocation type 1 if useInterlacePUSCH-Common is not provided and by uplink resource allocation type 2 if useInterlacePUSCH-Common is provided [6, TS 38.214]. For an initial UL BWP size of $N_{BWP}^{size}$ RBs, a UE processes the frequency domain resource assignment field for the operation without shared spectrum channel access as follows
- if $N_{BWP}^{size} \leq 180$
  - truncate the frequency domain resource assignment field to its $\lceil \log_2(N_{BWP}^{size} * (N_{BWP}^{size} + 1)/2) \rceil$ least significant bits and interpret the truncated frequency resource assignment field as for the frequency resource assignment field in DCI format 0_0 as described in [5, TS 38.212]
- else
  - insert $\lceil \log_2(N_{BWP}^{size} * (N_{BWP}^{size} + 1)/2) \rceil$ − 14 most significant bits with value set to '0' after the $N_{UL,hop}$ bits to the frequency domain resource assignment field, where $N_{UL,hop} = 0$ if the frequency hopping flag is set to '0' and $N_{UL,hop}$ is provided in Table 8.3-1 if the hopping flag bit is set to '1', and interpret the expanded frequency resource assignment field as for the frequency resource assignment field in DCI format 0_0 as described in [5, TS 38.212]
- end if
For an initial UL BWP size of $N_{BWP}^{size}$ RBs, a UE processes the frequency domain resource assignment field for the operation with shared spectrum channel access as follows
- if the higher layer parameter useInterlacePUSCH-Common-r16 is not configured
  - if $N_{BWP}^{size} \leq 90$
    - truncate the frequency domain resource assignment field to its $\lceil \log_2(N_{BWP}^{size} * (N_{BWP}^{size} + 1)/2) \rceil$ least significant bits and interpret the truncated frequency resource assignment field as for the frequency resource assignment field in DCI format 0_0 as described in [5, TS 38.212]
  - else
    - insert $\lceil \log_2(N_{BWP}^{size} * (N_{BWP}^{size} + 1)/2) \rceil$ − 12 most significant bits with value set to '0' after the $N_{UL,hop}$ bits to the frequency domain resource assignment field, where $N_{UL,hop} = 0$ if the frequency hopping flag is set to '0' and $N_{UL,hop}$ is provided in Table 8.3-1 if the hopping flag bit is set to '1', and interpret the expanded frequency resource assignment field as for the frequency resource assignment field in DCI format 0_0 as described in [5, TS 38.212]
  - end if
- else if the higher layer parameter useInterlacePUSCH-Common-r16 is configured
  - if the subcarrier spacing for the PUSCH transmission is 30 kHz
    - truncate the frequency domain resource assignment field to its 5 least significant bits and interpret the truncated frequency resouce assignment field as for the frequency resource assignment field in DCI format 0_0 as described in [5, TS 38.212]

TABLE 20-continued

- else if the subcarrier spacing for the PUSCH transmission is 15 kHz
  -truncate the frequency domain resource assignment field to its 6 least significant bits and interpret the truncated frequency resource assignment field as for the frequency resource assignment field in DCI format 0_0 as described in [5, TS 38.212]
- end if Additionally, when useInterlacePUSCH-Common is provided, the RAR UL grant field size may be defined/configured as follows.

4-4-1. Alt 1)

Since only X bits are required for the actual FDRA, the FDRA field size is defined as X bits and the remaining bits may be used as a reserved field. In addition, the reserved field position may be immediately in front of or rear of the FDRA field, or a specific position of the RAR UL grant (e.g., the last, i.e., LSBs in RAR UL grant).

Characteristically, when the SCS for PUSCH transmission is 30 kHz, X may be 5 bits, and when the SCS for PUSCH transmission is 35 kHz, X may be 6 bits.

As an example, if the example in which the reserved field position is the last one is applied, each field in the RAR grant may be defined as shown in Table 21.

TABLE 21

| RAR grant field | Number of bits |
| --- | --- |
| Frequency hopping flag (reserved) | 1 |
| PUSCH frequency resource allocation | 5, if the subcarrier spacing for the PUSCH transmission is 30 kHz<br>6, if the subcarrier spacing for the PUSCH transmission is 15 kHz |
| PUSCH time resource allocation | 4 |
| MCS | 4 |
| TPC command for PUSCH | 3 |
| CSI request | 1 |
| ChannelAccess-CPext | 0, for operation without shared spectrum channel access<br>2, for operation with shared spectrum channel access |
| Reserved | 6, if the subcarrier spacing for the PUSCH transmission is 15 kHz and for operation with shared spectrum channel access<br>7, if the subcarrier spacing for the PUSCH transmission is 30 kHz and for operation with shared spectrum channel access or,<br>6, if the subcarrier spacing for the PUSCH transmission is 15 kHz and for operation with shared spectrum channel access<br>7, if the subcarrier spacing for the PUSCH transmission is 30 kHz and for operation with shared spectrum channel access<br>8, if the subcarrier spacing for the PUSCH transmission is 15 kHz and for operation without shared spectrum channel access<br>9, if the subcarrier spacing for the PUSCH transmission is 30 kHz and for operation without shared spectrum channel access |

4-4-2. Alt 2)

Since only X bits are required for the actual FDRA, the FDRA field size may be defined as X bits and the remaining bits may be used as a reserved field. In addition, the reserved field position may be immediately in front of or rear of the FDRA field, or a specific position of the RAR UL grant (e.g., the last, i.e., LSBs in RAR UL grant).

At this time, since 5 bits are required when the SCS for PUSCH transmission is 30 kHz and 6 bits are required when the SCS is 15 kHz, X may be configured to 6 bits to satisfy both SCSs.

In this case, when the SCS is 30 kHz, the UE may truncate the FDRA field to 5 bits of the LSB (or MSB) and interpret it as the FDRA field.

As an example, if the example in which the reserved field position is the last one is applied, each field in the RAR grant may be defined as shown in Table 22.

TABLE 22

| RAR grant field | Number of bits |
|---|---|
| Frequency hopping flag (reserved) | 1 |
| PUSCH frequency resource allocation | 6 |
| PUSCH time resource allocation | 4 |
| MCS | 4 |
| TPC command for PUSCH | 3 |
| CSI request | 1 |
| ChannelAccess-CPext | 0, for operation without shared spectrum channel access 2, for operation with shared spectrum channel access |
| Reserved | 6, for operation with shared spectrum channel access or 6, for operation with shared spectrum channel access 8, for operation without shared spectrum channel access |

Y bit for LBT subband allocation may be further included in PUSCH frequency resource allocation. Accordingly, in Table 21 and/or Table 22, the Y bit may be added to the PUSCH frequency resource allocation field and the Y bit may be omitted from the Reserved field.

DRX (Discontinuous Reception) Operation

The UE may perform the DRX operation while performing the procedures and/or methods described/proposed above. The DRX configured UE may reduce power consumption by discontinuously receiving the DL signal. DRX may be performed in RRC (Radio Resource Control)_IDLE state, RRC_INACTIVE state, and RRC_CONNECTED state. In RRC_IDLE state and RRC_INACTIVE state, DRX is used to receive paging signal discontinuously. Hereinafter, DRX performed in the RRC_CONNECTED state will be described (RRC_CONNECTED DRX).

Figure 16:
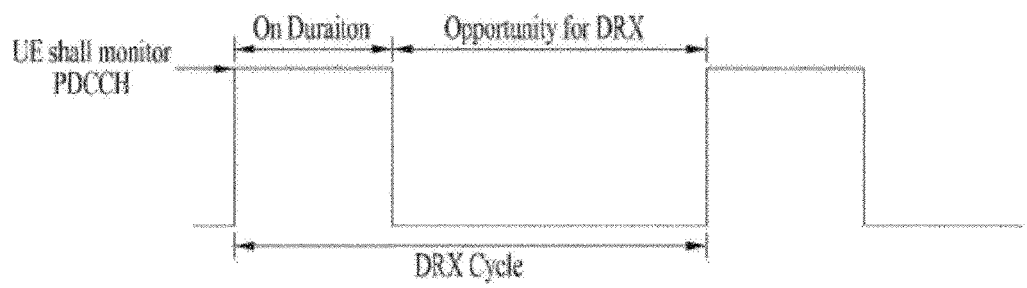

FIG. 16 illustrates DRX cycle (RRC_CONNECTED state).

Referring to FIG. 16, the DRX cycle consists of On Duration and Opportunity for DRX. The DRX cycle defines a time interval in which On Duration is periodically repeated. On Duration indicates a time period that the UE monitors to receive the PDCCH. When DRX is configured, the UE performs PDCCH monitoring during On Duration. If there is a successfully detected PDCCH during PDCCH monitoring, the UE operates an inactivity timer and maintains an awake state. On the other hand, if there is no PDCCH successfully detected during PDCCH monitoring, the UE enters a sleep state after On Duration ends. Accordingly, when DRX is configured, PDCCH monitoring/reception may be discontinuously performed in the time domain in performing the procedures and/or methods described/proposed above. For example, when DRX is configured, in the present disclosure, a PDCCH reception opportunity (e.g., a slot having a PDCCH search space) may be configured discontinuously according to the DRX configuration. On the other hand, when DRX is not configured, PDCCH monitoring/reception may be continuously performed in the time domain in performing the procedures and/or methods described/proposed above. For example, when DRX is not configured, PDCCH reception opportunities (e.g., a slot having a PDCCH search space) in the present disclosure may be continuously configured. Meanwhile, regardless of whether DRX is configured or not, PDCCH monitoring may be limited in a time interval configured as a measurement gap.

Table 23 shows the process of the UE related to DRX (RRC_CONNECTED state). Referring to table 23, DRX configuration information is received through higher layer (e.g., RRC) signaling, and whether DRX on/off is controlled by a DRX command of MAC layer. If DRX is configured, the UE may discontinuously perform PDCCH monitoring in performing the procedures and/or methods proposed/described in the present disclosure, as illustrated in FIG. 16.

| | Type of signals | UB procedure |
|---|---|---|
| 1$^{st}$ step | RRG signalling (MAC-CellGroupConfig) | Receive DRX configuration information |
| 2$^{nd}$ Step | MAC CB ( (Long) DRX command MAC CE) | Receive DRX command |
| 3$^{rd}$ Step | — | Monitor a PDCCH during an on-duration of a DRX cycle |

Here, MAC-CellGroupConfig includes configuration information necessary to configure MAC (Medium Access Control) parameters for the cell group. MAC-CellGroupConfig may also include configuration information related to DRX. For example, MAC-CellGroupConfig may include information as follows to define DRX.

Value of drx-OnDurationTimer: defines the length of the start duration of the DRX cycle Value of drx-InactivityTimer: defines the length of the time duration in which the UE remains awake after PDCCH occasion in which PDCCH indicating the initial UL or DL data is detected.

Value of drx-HARQ-RTT-TimerDL: defines the maximum time duration from when DL initial transmission is received until DL retransmission is received.

Value of drx-HARQ-RTT-TimerDL: defines the length of the maximum time duration from when grant for UL initial transmission is received until grant for UL retransmission is received.

drx-LongCycleStartOffset: defines the length of time and the starting point of DRX cycle.

drx-ShortCycle (optional): defines the time duration of short DRX cycle

Here, if any one of drx-OnDurationTimer, drx-InactivityTimer, drx-HARQ-RTT-TimerDL, drx-HARQ-RTT-TimerDL is in operation, the UE performs PDCCH monitoring at every PDCCH occasion while maintaining the awake state.

After the operation described in each embodiments of the present disclosure, the UE may perform such a DRX-related operation. The UE performs RACH procedure according to embodiment of the present disclosure. The UE performs the RACH procedure according to an embodiment of the present disclosure, and the UE then performs PDCCH monitoring during On Duration and, when there is a PDCCH successfully detected during PDCCH monitoring, the UE operates an inactivity timer (drx-InactivityTimer) and maintains awake state.

Implementation Example

Figure 17:
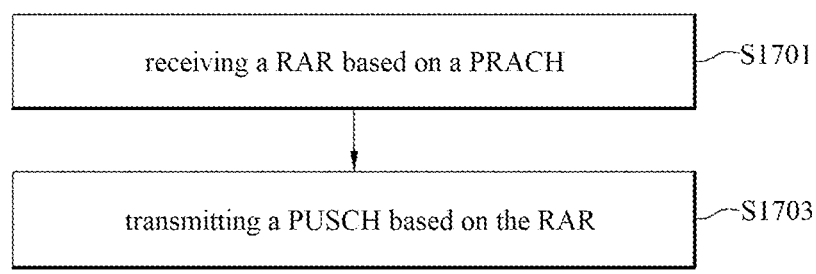

FIG. 17 is a flowchart of a signal transmission/reception method according to embodiments of the present disclosure.

Referring to FIG. 17, embodiments of the present disclosure may be performed by the UE and may include a step of receiving RAR based on a PRACH (S1701) and a step of transmitting a PUSCH based on RAR (S1703). Although not shown, the embodiment of the present disclosure performed from the standpoint of the base station may include a step of transmitting RAR based on PRACH and receiving a PUSCH based on RAR.

RAR may be configured based on the embodiment 4. For example, the RAR may be a fallback RAR for message A in a 2-step random access procedure. RAR may be Msg. 2 RAR for Msg. 1 PRACH in a 4-step random access procedure.

The channel access type (LBT type) for PUSCH (Msg. 3 PUSCH) may be determined based on one or more of the methods of the proposed method 4-1-1 to 4-1-6 of the embodiment 4.

Frequency resource for transmitting a PUSCH may be determined based on FDRA (Frequency domain resource assignment) field. According to 4-3-2 of the present disclosure, the interpretation of the FDRA field for the PUSCH transmitted in shared spectrum may be different from the interpretation of the FDRA field for the PUSCH transmitted in non-shared spectrum.

For example, depending on whether higher layer parameter uselnterlacePUSCH-Common is provided, whether the 12-bit FDRA field is truncated to some of its LSBs or whether MSBs are padded in addition to the 12-bit FDRA field is different, the number of X LSB and Y MSB is also different. That is, the FDRA field may be truncated to its X LSB or the FDRA field may be padded with Y MSB based on whether or not interlace allocation of PUSCH for shared spectrum channel access is provided.

The FDRA field is truncated or padded, and the truncated or padded FDRA field is interpreted as FDRA field of DCI format 0_0.

According to 4-3-2-A-i, based on the interlace allocation of PUSCH for shared spectrum channel access being not provided and the number of PRBs in the BWP being 90 or less, the FDRA field is truncated to its X LSB, where the X LSB is determined based on the number of PRBs in the BWP.

When the number of PRBs in BWP is $N(N_{BWP}^{size}=N)$, X LSB is determined as $\lceil \log_2(N_{BWP}^{size}*(N_{BWP}^{size}+1)/2)\rceil$ LSB, that is, ceil $(\log_2(N*(N+1)/2))$ LSB.

According to 4-3-2-A-ii, based on the interlace allocation of PUSCH for shared spectrum channel access being not provided and the number of PRBs in the BWP being more than 90, the FDRA field is padded with Y MSB, where the Y MSB is determined based on the number of PRBs in the BWP.

When the number of PRBs in BWP is $N(N_{BWP}^{size}=N)$, Y MSB is determined as $\lceil \log_2(N_{BWP}^{size}*(N_{BWP}^{size}+1)/2)\rceil -12$ MSB, that is, ceil $(\log_2(N*(N+1)/2))-12$ MSB.

The threshold value of 90 is determined in consideration of the maximum number of PRBs that can be indicated by 12 bits within the BWP when resources are allocated based on not providing interlace allocation of PUSCH for shared spectrum channel access.

According to 4-3-2-B, based on the provision of interlace allocation of PUSCH for shared spectrum channel access, X LSB is determined to be 5 LSB for 30 kHz SCS and 6 LSB for 15 kHz SCS.

In addition to the operation described with reference to FIG. 17, one or more of the operations described with reference to FIGS. 1 to 16 and/or the operations described with respect to embodiments 1 to 4 may be combined and additionally performed. For example, the UE may perform uplink LBT before transmission of the PRACH. Alternatively, the UE may monitor the PDCCH based on DRX configured after random access.

Example of a Communication System to which the Present Disclosure is Applied

Although not limited thereto, various descriptions, functions, procedures, proposals, methods, and/or operational flowcharts of the present disclosure disclosed in this document may be applied in various fields requiring wireless communication/connection (e.g., 5G) between devices.

Hereinafter, it will be exemplified in more detail with reference to the drawings. In the following drawings/descriptions, the same reference numerals may represent the same or corresponding hardware blocks, software blocks, or functional blocks, unless otherwise indicated.

Figure 18:
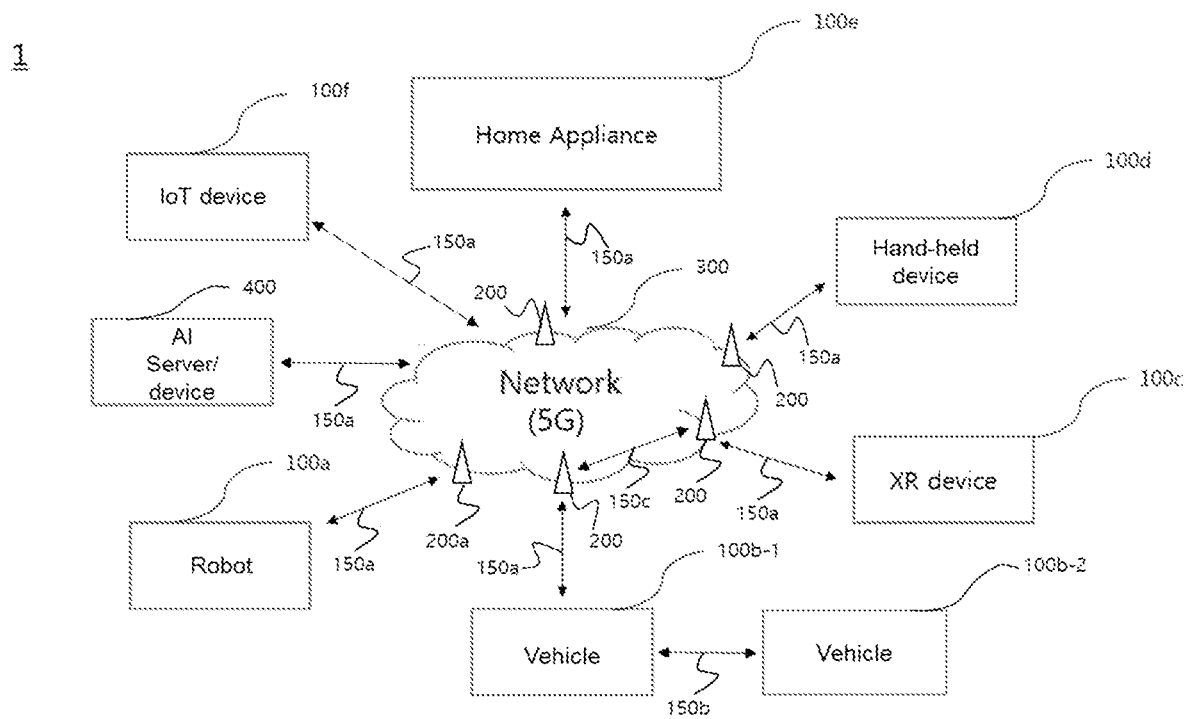
FIG. 18 to FIG. 20 illustrate apparatuses according to an embodiment of the present disclosure.

FIG. 18 illustrates a communication system 1 applied to the present disclosure.

Referring to FIG. 18, the communication system 1 applied to the present disclosure includes a wireless device, a base station, and a network. Here, the wireless device means a device that performs communication using a wireless access technology (e.g., 5G NR (New RAT), LTE (Long Term Evolution)), and may be referred to as a communication/wireless/5G device. Although not limited thereto, the wireless device includes a robot 100a, a vehicle 100b-1, 100b-2, an eXtended Reality (XR) device 100c, a hand-held device 100d, and a home appliance 100e, an Internet of Thing (IoT) device 100f, and an AI device/server 400. For example, the vehicle may include a vehicle equipped with a wireless communication function, an autonomous driving vehicle, a vehicle capable of performing inter-vehicle communication, and the like. Here, the vehicle may include an Unmanned Aerial Vehicle (UAV) (e.g., a drone). XR devices include AR (Augmented Reality)/VR (Virtual Reality)/MR (Mixed Reality) devices, and may be implemented in the form of a Head-Mounted Device (HMD), a Head-Up Display (HUD) provided in a vehicle, a television, a smartphone, a computer, a wearable device, a home appliance, a digital signage, a vehicle, a robot, and the like. The portable device may include a smart phone, a smart pad, a wearable device (e.g., a smart watch, smart glasses), a computer (e.g., a laptop computer), and the like. Home appliances may include a TV, a refrigerator, a washing machine, and the like. The IoT device may include a sensor, a smart meter, and the like. For example, the base station and the network may be implemented as a wireless device, and the specific wireless device 200a may operate as a base station/network node to other wireless devices.

The wireless devices 100a to 100f may be connected to the network 300 through the base station 200. Artificial intelligence (AI) technology may be applied to the wireless devices 100a to 100f, and the wireless devices 100a to 100f may be connected to the AI server 400 through the network 300. The network 300 may be configured using a 3G network, a 4G (e.g., LTE) network, or a 5G (e.g., NR)

network. The wireless devices 100a to 100f may communicate with each other through the base station 200/network 300, but may also communicate directly (e.g., sidelink communication) without passing through the base station/network. For example, the vehicles 100b-1 and 100b-2 may perform direct communication (e.g., Vehicle to Vehicle (V2V)/Vehicle to everything (V2X) communication). In addition, the IoT device (e.g., sensor) may directly communicate with other IoT devices (e.g., sensor) or other wireless devices 100a to 100f.

Wireless communication/connection 150a, 150b, 150c may be performed between the wireless devices 100a to 100f and the base station 200 and between the base station 200 and the base station 200. Here, wireless communication/connection may be made through various wireless access technologies (e.g., 5G NR) such as uplink/downlink communication 150a, sidelink communication 150b (or D2D communication), and inter-base station communication 150c. Through the wireless communication/connection 150a, 150b, and 150c, the wireless device and the base station/wireless device, and the base station and the base station may transmit/receive radio signals to each other. For example, the wireless communication/connection 150a, 150b, and 150c may transmit/receive signals through various physical channels. To this end, based on various proposals of the present disclosure, at least part of various configuration information configuration processes, various signal processing processes (e.g., channel encoding/decoding, modulation/demodulation, resource mapping/demapping, etc.), resource allocation processes, etc. may be performed.

Example of a Wireless Device to which the Present Disclosure is Applied.

Figure 19:
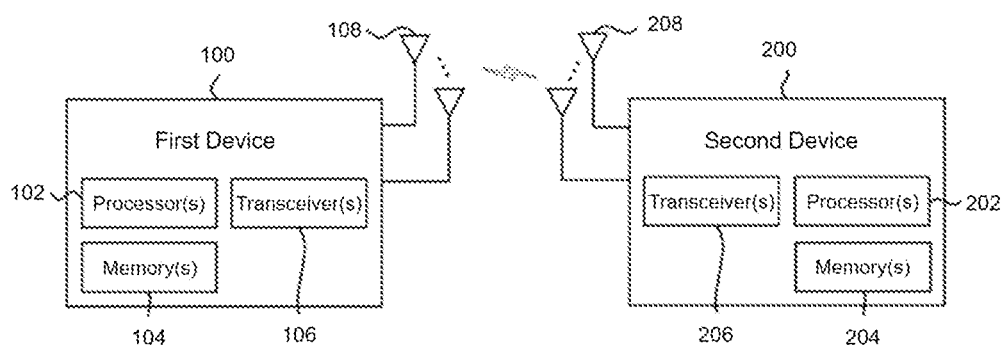

FIG. 19 illustrates wireless devices to which the present disclosure is applied.

Referring to FIG. 19, the first wireless device 100 and the second wireless device 200 may transmit/receive wireless signals through various wireless access technologies (e.g., LTE, NR). Here, {first wireless device 100, second wireless device 200} may correspond to {wireless device 100x, base station 200} and/or {wireless device 100x, wireless device 100x} of FIG. 18.

The first wireless device 100 includes one or more processors 102 and one or more memories 104, and may further include one or more transceivers 106 and/or one or more antennas 108. The processor 102 controls the memory 104 and/or the transceiver 106 and may be configured to implement the descriptions, functions, procedures, suggestions, methods, and/or operational flow charts disclosed herein. For example, the processor 102 may process information in the memory 104 to generate first information/signal, and then transmit a wireless signal including the first information/signal through the transceiver 106. In addition, the processor 102 may receive the radio signal including the second information/signal through the transceiver 106, and then store the information obtained from the signal processing of the second information/signal in the memory 104. The memory 104 may be connected to the processor 102 and may store various information related to the operation of the processor 102. For example, the memory 104 may store software code including instructions for performing some or all of processes controlled by the processor 102, or for performing the descriptions, functions, procedures, suggestions, methods, and/or operational flowcharts disclosed in the document. Here, the processor 102 and the memory 104 may be part of a communication modem/circuit/chip designed to implement a wireless communication technology (e.g., LTE, NR). A transceiver 106 may be coupled to the processor 102 and may transmit and/or receive wireless signals via one or more antennas 108. The transceiver 106 may include a transmitter and/or a receiver. The transceiver 106 may be used interchangeably with a radio frequency (RF) unit. In the present disclosure, a wireless device may refer to a communication modem/circuit/chip.

The second wireless device 200 includes one or more processors 202, one or more memories 204, and may further include one or more transceivers 206 and/or one or more antennas 208. The processor 202 controls the memory 204 and/or the transceiver 206 and may be configured to implement the descriptions, functions, procedures, suggestions, methods, and/or flow charts disclosed herein. For example, the processor 202 may process the information in the memory 204 to generate third information/signal, and then transmit a wireless signal including the third information/signal through the transceiver 206. In addition, the processor 202 may receive the radio signal including the fourth information/signal through the transceiver 206, and then store information obtained from signal processing of the fourth information/signal in the memory 204. The memory 204 may be connected to the processor 202 and may store various information related to the operation of the processor 202. For example, the memory 204 may store software code including instructions for performing some or all of the processes controlled by the processor 202, or for performing the descriptions, functions, procedures, suggestions, methods, and/or operational flowcharts disclosed in the document. Here, the processor 202 and the memory 204 may be part of a communication modem/circuit/chip designed to implement a wireless communication technology (e.g., LTE, NR). The transceiver 206 may be coupled to the processor 202 and may transmit and/or receive wireless signals via one or more antennas 208. Transceiver 206 may include a transmitter and/or receiver. Transceiver 206 may be used interchangeably with an RF unit. In the present disclosure, a wireless device may refer to a communication modem/circuit/chip.

Hereinafter, hardware elements of the wireless devices 100 and 200 will be described in more detail. Although not limited thereto, one or more protocol layers may be implemented by one or more processors 102, 202. For example, one or more processors 102, 202 may implement one or more layers (e.g., functional layers such as PHY, MAC, RLC, PDCP, RRC, SDAP). The one or more processors 102, 202 may generate one or more Protocol Data Units (PDUs) and/or one or more Service Data Units (SDUs) according to the description, function, procedure, proposal, method and/or operational flowcharts disclosed herein. One or more processors 102, 202 may generate messages, control information, data, or information according to the description, function, procedure, proposal, method, and/or flow charts disclosed herein. The one or more processors 102 and 202 generate a signal (e.g., a baseband signal) including PDUs, SDUs, messages, control information, data or information according to the functions, procedures, proposals and/or methods disclosed herein and provide it to one or more transceivers 106 and 206. One or more processors 102, 202 may receive signals (e.g., baseband signals) from one or more transceivers 106, 206, and may obtain PDUs, SDUs, messages, control information, data, or information according to description, functions, procedures, proposals, methods, and/or operational flowcharts disclosed herein.

One or more processors 102, 202 may be referred to as a controller, microcontroller, microprocessor, or microcomputer. One or more processors 102, 202 may be implemented by hardware, firmware, software, or a combination thereof. For example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in one or more processors 102, 202. The descriptions, functions, procedures, suggestions, methods, and/or flowcharts of operations disclosed in this document may be implemented using firmware or software, and the firmware or software may be implemented to include modules, procedures, functions, and the like. Firmware or software configured to perform the descriptions, functions, procedures, suggestions, methods, and/or flow charts disclosed herein may be included in one or more processors 102, 202 or may be stored in one or more memories 104, 204 and driven by one or more processors 102, 202. The descriptions, functions, procedures, suggestions, methods, and/or flowcharts of operations disclosed herein may be implemented using firmware or software in the form of code, instructions, and/or a set of instructions.

One or more memories 104, 204 may be coupled to one or more processors 102, 202 and may store various forms of data, signals, messages, information, programs, codes, instructions, and/or instructions. One or more memories 104, 204 may be comprised of ROM, RAM, EPROM, flash memory, hard drives, registers, cache memory, computer readable storage media, and/or combinations thereof. One or more memories 104, 204 may be located inside and/or external to one or more processors 102, 202. Additionally, one or more memories 104, 204 may be coupled to one or more processors 102, 202 through various technologies, such as wired or wireless connections.

One or more transceivers 106, 206 may transmit user data, control information, radio signals/channels, etc. referred to in the methods and/or operation flowcharts herein, to one or more other devices. The one or more transceivers 106, 206 may receive user data, control information, radio signals/channels, etc. referred to in the descriptions, functions, procedures, suggestions, methods and/or flow charts, etc. disclosed herein, from one or more other devices. For example, one or more transceivers 106, 206 may be coupled to one or more processors 102, 202 and may transmit and receive wireless signals. For example, one or more processors 102, 202 may control one or more transceivers 106, 206 to transmit user data, control information, or wireless signals to one or more other devices. In addition, one or more processors 102, 202 may control one or more transceivers 106, 206 to receive user data, control information, or wireless signals from one or more other devices. Further, one or more transceivers 106, 206 may be coupled to one or more antennas 108, 208, and may be configured to transmit and receive, through the one or more antennas 108, 208, user data, control information, radio signals/channels, etc. mentioned in description, functions, procedures, proposals, methods and/or operation flowcharts. In this document, one or more antennas may be a plurality of physical antennas or a plurality of logical antennas (e.g., antenna ports). The one or more transceivers 106, 206 convert the received radio signal/channel, etc. from the RF band signal into a baseband signal to process the received user data, control information, radio signal/channel, etc. using the one or more processors 102, 202. One or more transceivers 106 and 206 may convert user data, control information, radio signals/channels, etc. processed using one or more processors 102 and 202 from baseband signals to RF band signals. To this end, one or more transceivers 106, 206 may include (analog) oscillators and/or filters.

Figure 20:
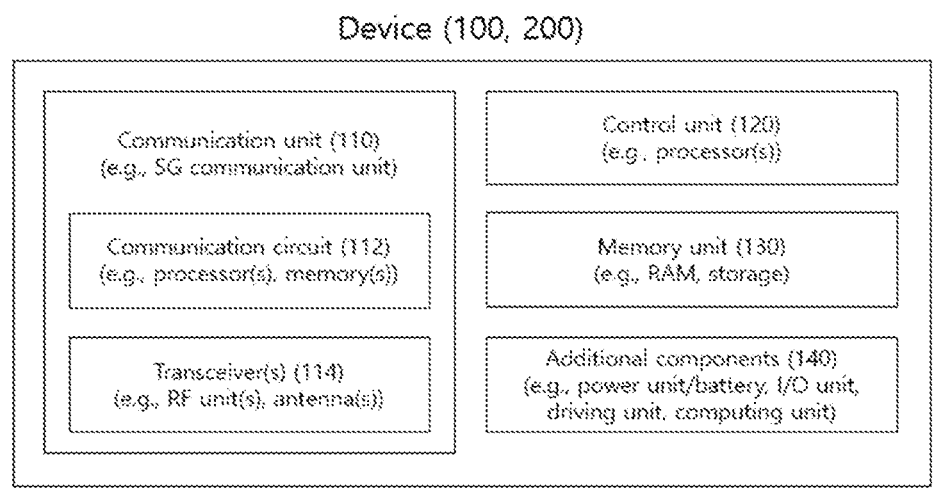

Example of Application of a Wireless Device to which the Present Disclosure is Applied FIG. 20 shows another example of a wireless device applied to the present disclosure. The wireless device may be implemented in various forms according to use-examples/services (refer to FIG. 18).

Referring to FIG. 20, wireless devices 100 and 200 may correspond to wireless devices 100 and 200 of FIG. 19, and may consist of various elements, components, units/units, and/or modules. For example, the wireless devices 100 and 200 may include a communication unit 110, a control unit 120, a memory unit 130, and an additional element 140. The communication unit may include communication circuitry 112 and transceiver(s) 114. For example, communication circuitry 112 may include one or more processors 102, 202 and/or one or more memories 104, 204 of FIG. 19. For example, the transceiver(s) 114 may include one or more transceivers 106, 206 and/or one or more antennas 108, 208 of FIG. 19. The control unit 120 is electrically connected to the communication unit 110, the memory unit 130, and the additional element 140, and controls general operations of the wireless device. For example, the controller 120 may control the electrical/mechanical operation of the wireless device based on the program/code/command/information stored in the memory unit 130. In addition, the control unit 120 may transmit the information stored in the memory unit 130 to the outside (e.g., another communication device) through the communication unit 110 through a wireless/wired interface, or may store information received from the outside (e.g., another communication device) through a wireless/wired interface through the communication unit 110 in the memory unit 130.

The additional element 140 may be variously configured according to the type of the wireless device. For example, the additional element 140 may include at least one of a power unit/battery, an input/output unit (I/O unit), a driving unit, and a computing unit. Although not limited thereto, a wireless device may include a robot (FIGS. 18 and 100a), a vehicle (FIGS. 18, 100b-1, 100b-2), an XR device (FIGS. 18 and 100c), a mobile device (FIGS. 18 and 100d), and a home appliance (FIG. 18, 100e), IoT device (FIG. 18, 1000, digital broadcasting terminal, hologram device, public safety device, MTC device, medical device, fintech device (or financial device), security device, climate/environment device, It may be implemented in the form of an AI server/device (FIGS. 18 and 400), a base station (FIGS. 18 and 200), and a network node. The wireless device may be mobile or used in a fixed location depending on the use-example/service.

In FIG. 20, various elements, components, units/units, and/or modules in the wireless devices 100 and 200 may be all interconnected through a wired interface, or at least some of them may be wirelessly connected through the communication unit 110. For example, in the wireless devices 100 and 200, the control unit 120 and the communication unit 110 are connected by wire, and the control unit 120 and the first unit (e.g., 130, 140) may be connected to the communication unit 110 wirelessly through the communication unit 110. In addition, each element, component, unit/unit, and/or module within the wireless device 100, 200 may further include one or more elements. For example, the controller 120 may be configured with one or more processor sets. For example, the control unit 120 may be configured as a set of a communication control processor, an application processor, an electronic control unit (ECU), a graphic processing processor, a memory control processor, and the like. As another example, the memory unit 130 may include random access memory (RAM), dynamic RAM (DRAM), read only memory (ROM), flash memory, volatile memory, and non-volatile memory. volatile memory) and/or a combination thereof Example of a Vehicle or an Autonomous Driving Vehicle to which the Present Disclosure is Applied FIG. 21 exemplifies a vehicle or an autonomous driving vehicle to which the present disclosure is applied. The vehicle or autonomous driving vehicle may be implemented as a mobile robot, a vehicle, a train, an aerial vehicle (AV), a ship, and the like.

Figure 21:
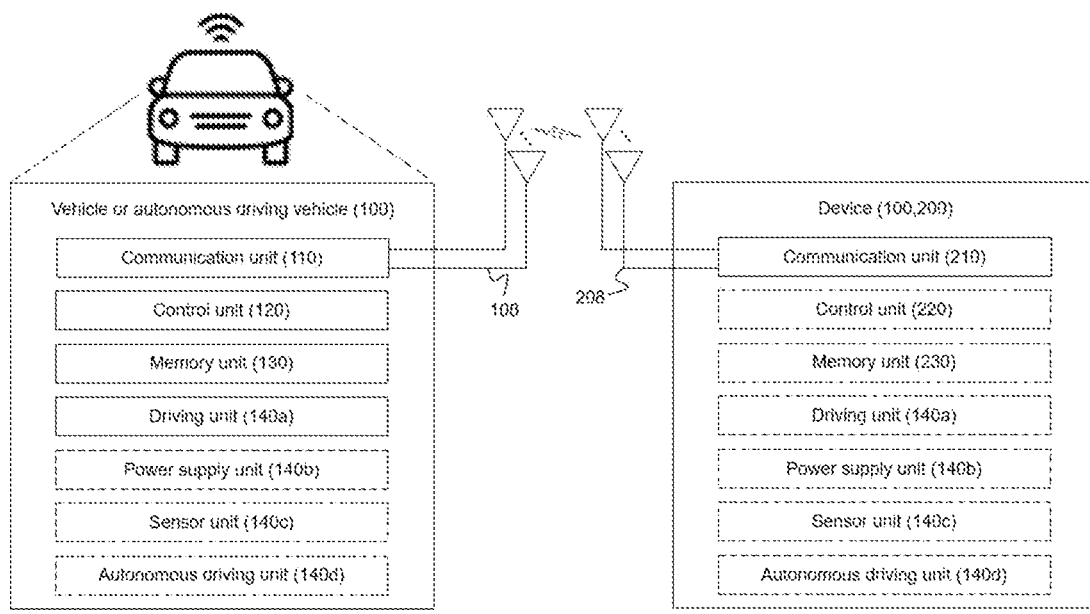
FIG. 21 illustrates an example of a vehicle or an autonomous driving vehicle to which the present disclosure is applied.

Referring to FIG. 21, the vehicle or autonomous vehicle 100 may include an antenna unit 108, a communication unit 110, a control unit 120, a driving unit 140a, a power supply unit 140b, and a sensor unit 140c, and an autonomous driving unit 140d. The antenna unit 108 may be configured as a part of the communication unit 110. Blocks 110/130/140a-140d correspond to blocks 110/130/140 of FIG. 20, respectively.

The communication unit 110 may transmit and receive signals (e.g., data, control signals, etc.) with external devices such as other vehicles, base stations (e.g., base stations, roadside base stations, etc.), servers, and the like. The controller 120 may control elements of the vehicle or the autonomous driving vehicle 100 to perform various operations. The controller 120 may include an Electronic Control Unit (ECU). The driving unit 140a may cause the vehicle or the autonomous driving vehicle 100 to run on the ground. The driving unit 140a may include an engine, a motor, a power train, a wheel, a brake, a steering device, and the like. The power supply unit 140b supplies power to the vehicle or the autonomous driving vehicle 100, and may include a wired/wireless charging circuit, a battery, and the like. The sensor unit 140c may obtain vehicle status, surrounding environment information, user information, and the like. The sensor unit 140c may include an inertial measurement unit (IMU) sensor, a collision sensor, a wheel sensor, a speed sensor, an inclination sensor, a weight sensor, a heading sensor, a position module, and a vehicle forward movement/reverse movement sensor, a battery sensor, a fuel sensor, a tire sensor, a steering sensor, a temperature sensor, a humidity sensor, an ultrasonic sensor, an illuminance sensor, a pedal position sensor, and the like. The autonomous driving unit 140d may implement a technology for maintaining a driving lane, a technology for automatically adjusting speed such as adaptive cruise control, a technology for automatically driving along a predetermined route, and a technology for automatically setting a route when a destination is set.

As an example, the communication unit 110 may receive map data, traffic information data, and the like from an external server. The autonomous driving unit 140d may generate an autonomous driving route and a driving plan based on the acquired data. The controller 120 may control the driving unit 140a to move the vehicle or the autonomous driving vehicle 100 along the autonomous driving path (e.g., speed/direction adjustment) according to the driving plan. During autonomous driving, the communication unit 110 may obtain the latest traffic information data from an external server non/periodically, and may acquire surrounding traffic information data from surrounding vehicles. Also, during autonomous driving, the sensor unit 140c may acquire vehicle state and surrounding environment information. The autonomous driving unit 140d may update the autonomous driving route and driving plan based on the newly acquired data/information. The communication unit 110 may transmit information about a vehicle location, an autonomous driving route, a driving plan, and the like to an external server. The external server may predict traffic information data in advance using AI technology or the like based on information collected from the vehicle or autonomous driving vehicles, and may provide the predicted traffic information data to the vehicle or autonomous driving vehicles.

It is apparent to those skilled in the art that the present disclosure can be embodied in other specific forms without departing from the characteristics of the present disclosure. Accordingly, the above detailed description should not be construed as restrictive in all respects but as exemplary. The scope of the present disclosure should be determined by a reasonable interpretation of the appended claims, and all modifications within the equivalent scope of the present disclosure are included in the scope of the present disclosure.

As described above, the present disclosure can be applied to various wireless communication systems.

The invention claimed is:

1. A method for transmitting and receiving signals by a user equipment (UE) operating in a wireless communication system, the method comprising:
   receiving a random access response (RAR) based on a physical random access channel (PRACH); and
   transmitting, in a bandwidth part (BWP), a physical uplink shared channel (PUSCH) for shared spectrum channel access, based on the RAR;
   wherein a frequency domain resource allocation in the BWP for the PUSCH transmission is based on a frequency domain resource assignment (FDRA) field in the RAR,
   wherein, based on information regarding interlace allocation of the PUSCH being not provided by higher-layer signaling:
      (i) based on a number of physical resource blocks (PRBs) (N) in the BWP being equal to or less than a threshold of 90, the FDRA field is truncated to $\lceil \log_2 (N*(N+1)/2) \rceil$ least significant bits (LSBs), and
      (ii) based on the number of PRBs (N) in the BWP being greater than the threshold of 90, $\lceil \log_2 (N*(N+1)/2) \rceil - 12$ bits with value set to 0 are inserted to the FDRA field,
   wherein, based on the information regarding the interlace allocation of the PUSCH being provided by the higher-layer signaling:
      (i) based on a subcarrier spacing (SCS) for the BWP being 30 kHz, the FDRA field is truncated to 5 LSBs, or
      (ii) based on the SCS for the BWP being 15 kHz, the FDRA field is truncated to 6 LSBs, and
   wherein the FDRA field is interpreted as a FDRA field in downlink control information (DCI) format 0_0.

2. The method of claim 1, wherein:
   based on the information regarding the interlace allocation of the PUSCH being not provided by the higher-layer signaling, an uplink resource allocation type 1 is used, and
   based on the information regarding the interlace allocation of the PUSCH being provided by the higher-layer signaling, an uplink resource allocation type 2 is used.

3. The method of claim 1, wherein:
   for the shared spectrum channel access, the FDRA field of 12 bits is received from a base station.

4. The method of claim 3, wherein the threshold of 90 is determined in consideration of a maximum number of PRBs in the BWP that can be indicated by 12 bits when resources are allocated based on the information regarding the interlace allocation of the PUSCH being not provided by the higher-layer signaling.

5. The method of claim 1, wherein:
the $\lceil \log_2(N*(N+1)/2) \rceil -12$ bits with a value set to 0 are inserted to the FDRA field after a number of bits related to an uplink frequency hopping,
based on a frequency hopping flag field in the RAR being set to 0, the number of bits related to the uplink frequency hopping is 0, and
based on the frequency hopping flag field in the RAR being set to 1, the number of bits related to the uplink frequency hopping is not 0.

6. A user equipment (UE) configured to transmit and receive signals in a wireless communication system, the UE comprising:
at least one transceiver;
at least one processor; and
at least one memory operatively coupled to the at least one processor and storing instructions that, based on being executed, cause the at least one processor to perform operations comprising:
receiving a random access response (RAR) based on a physical random access channel (PRACH); and
transmitting, in a bandwidth part (BWP), a physical uplink shared channel (PUSCH) for shared spectrum channel access, based on the RAR,
wherein a frequency domain resource allocation in the BWP for the PUSCH transmission is based on a frequency domain resource assignment (FDRA) field in the RAR,
wherein, based on information regarding interlace allocation of the PUSCH being not provided by higher-layer signaling:
(i) based on a number of physical resource blocks (PRBs) (N) in the BWP being equal to or less than a threshold of 90, the FDRA field is truncated to $\lceil \log_2 (N*(N+1)/2) \rceil$ least significant bits (LSBs), and
(ii) based on the number of PRBs (N) in the BWP being greater than the threshold of 90, $\lceil \log_2 (N*(N+1)/2) \rceil -12$ bits with value set to 0 are inserted to the FDRA field,
wherein, based on the information regarding the interlace allocation of the PUSCH being provided by the higher-layer signaling:
(i) based on a subcarrier spacing (SCS) for the BWP being 30 kHz, the FDRA field is truncated to 5 LSBs, or
(ii) based on the SCS for the BWP being 15 kHz, the FDRA field is truncated to 6 LSBs, and
wherein the FDRA field is interpreted as a FDRA field in downlink control information (DCI) format 0_0.

7. The UE of claim 6, wherein:
based on the information regarding the interlace allocation of the PUSCH being not provided by the higher-layer signaling, an uplink resource allocation type 1 is used, and
based on the information regarding the interlace allocation of the PUSCH being provided by the higher-layer signaling, an uplink resource allocation type 2 is used.

8. The UE of claim 6, wherein:
for the shared spectrum channel access, the FDRA field of 12 bits is received from a base station.

9. The UE of claim 8, wherein:
the threshold of 90 is determined in consideration of a maximum number of PRBs in the BWP that can be indicated by 12 bits when resources are allocated based on the information regarding the interlace allocation of the PUSCH being not provided by the higher-layer signaling.

10. The method of claim 6, wherein:
the $\lceil \log_2(N*(N+1)/2) \rceil -12$ bits with a value set to 0 are inserted to the FDRA field after a number of bits related to an uplink frequency hopping,
based on a frequency hopping flag field in the RAR being set to 0, the number of bits related to the uplink frequency hopping is 0, and
based on the frequency hopping flag field in the RAR being set to 1, the number of bits related to the uplink frequency hopping is not 0.

11. A method for transmitting and receiving signals by a base station operating in a wireless communication system, the method comprising:
transmitting a random access response (RAR) based on a physical random access channel (PRACH); and
receiving, in a bandwidth part (BWP), a physical uplink shared channel (PUSCH) for shared spectrum channel access, based on the RAR;
wherein a frequency domain resource allocation in the BWP for the PUSCH transmission is based on a frequency domain resource assignment (FDRA) field in the RAR,
wherein, based on information regarding interlace allocation of the PUSCH being not provided by higher-layer signaling:
(i) based on a number of physical resource blocks (PRBs) (N) in the BWP being equal to or less than a threshold of 90, the FDRA field is truncated to $\lceil \log_2 (N*(N+1)/2) \rceil$ least significant bits (LSBs), and
(ii) based on the number of PRBs (N) in the BWP being greater than the threshold of 90, $\lceil \log_2 (N*(N+1)/2) \rceil -12$ bits with value set to 0 are inserted to the FDRA field.
wherein, based on the information regarding the interlace allocation of the PUSCH being provided by the higher-layer signaling:
(i) based on a subcarrier spacing (SCS) for the BWP being 30 kHz, the FDRA field is truncated to 5 LSBs, or
(ii) based on the SCS for the BWP being 15 kHz, the FDRA field is truncated to 6 LSBs, and
wherein the FDRA field is interpreted as a FDRA field in downlink control information (DCI) format 0_0.

12. The method of claim 11, wherein:
based on the information regarding the interlace allocation of the PUSCH being not provided by the higher-layer signaling, an uplink resource allocation type 1 is used, and
based on the information regarding the interlace allocation of the PUSCH being provided by the higher-layer signaling, an uplink resource allocation type 2 is used.

13. The method of claim 11, wherein:
for the shared spectrum channel access, the FDRA field of 12 bits is transmitted by the base station.

14. The method of claim 13, wherein:
the threshold of 90 is determined in consideration of a maximum number of PRBs in the BWP that can be indicated by 12 bits when resources are allocated based on the information regarding the interlace allocation of the PUSCH being not provided by the higher-layer signaling.

15. The method of claim 9, wherein:
the $\lceil \log_2 (N*(N+1)/2) \rceil - 12$ bits with value set to 0 are inserted to the FDRA field after a number of bits related to an uplink frequency hopping,
based on a frequency hopping flag field in the RAR being set to 0, the number of bits related to the uplink frequency hopping is 0, and
based on the frequency hopping flag field in the RAR being set to 1, the number of bits related to the uplink frequency hopping is not 0.

16. A method for transmitting and receiving signals by a user equipment (UE) operating in a wireless communication system, the method comprising:
receiving a random access response (RAR) based on a physical random access channel (PRACH); and
transmitting, in a bandwidth part (BWP), a physical uplink shared channel (PUSCH) for shared spectrum channel access, based on the RAR;
wherein a frequency domain resource allocation in the BWP for the PUSCH transmission is based on a frequency domain resource assignment (FDRA) field in the RAR,
wherein, based on information regarding interlace allocation of the PUSCH being not provided by higher-layer signaling:
(i) based on a number of physical resource blocks (PRBs) (N) in the BWP being equal to or less than a threshold of 90, the FDRA field is truncated to $\lceil \log_2 (N*(N+1)/2) \rceil - 12$ least significant bits (LSBs), and
(ii) based on the number of PRBs (N) in the BWP being greater than the threshold of 90, the FDRA field is expanded to include $\lceil \log_2 (N*(N+1)/2) \rceil - 12$ bits with value set to 0 that are inserted to the FDRA field, wherein, based on the information regarding the interlace allocation of the PUSCH being provided by the higher-layer signaling:
(i) based on a subcarrier spacing (SCS) for the BWP being 30kHz, the FDRA field is truncated to 5 LSBs, or
(ii) based on the SCS for the BWP being 15 kHz, the FDRA field is truncated to 6 LSBs, and
wherein the FDRA field is interpreted as a FDRA field in downlink control information (DCI) format 0_0.

17. The method of claim 16, wherein:
based on the information regarding the interlace allocation of the PUSCH being not provided by the higher-layer signaling, an uplink resource allocation type 1 is used, and
based on the information regarding the interlace allocation of the PUSCH being provided by the higher-layer signaling, an uplink resource allocation type 2 is used.

18. The method of claim 16, wherein:
for the shared spectrum channel access, the FDRA field of 12 bits is received from a base station.

19. The method of claim 18, wherein the threshold of 90 is determined in consideration of a maximum number of PRBs in the BWP that can be indicated by 12 bits when resources are allocated based on the information regarding the interlace allocation of the PUSCH being not provided by the higher-layer signaling.

20. The method of claim 16, wherein:
the $\lceil \log_2 (N*(N+1)/2) \rceil - 12$ bits with value set to 0 are inserted to the FDRA field after a number of bits related to an uplink frequency hopping,
based on a frequency hopping flag field in the RAR being set to 0, the number of bits related to the uplink frequency hopping is 0, and
based on the frequency hopping flag field in the RAR being set to 1, the number of bits related to the uplink frequency hopping is not 0.

* * * * *